United States Patent
Suau et al.

(10) Patent No.: US 6,946,510 B2
(45) Date of Patent: Sep. 20, 2005

(54) USE OF WEAKLY ANIONIC COPOLYMERS AS DISPERSING AND/OR GRINDING AID AGENT OF AN AQUEOUS SUSPENSION OF MINERAL MATERIALS

(75) Inventors: Jean-Marc Suau, Lucenay (FR);
Christian Jacquemet, Lyons (FR);
Jacques Mongoin, Quincieux (FR);
Patrick A. C. Gane, Rothrist (CH)

(73) Assignee: Coatex S.A.S, Genay (FR)

( * ) Notice: Subject to any disclaimer, the term of this patent is extended or adjusted under 35 U.S.C. 154(b) by 16 days.

(21) Appl. No.: 10/311,219

(22) PCT Filed: Jun. 12, 2001

(86) PCT No.: PCT/FR01/01804

§ 371 (c)(1),
(2), (4) Date: Jul. 2, 2003

(87) PCT Pub. No.: WO01/96007

PCT Pub. Date: Dec. 20, 2001

(65) Prior Publication Data

US 2004/0019148 A1 Jan. 29, 2004

(30) Foreign Application Priority Data

Jun. 15, 2000 (FR) .............................. 00 07639

(51) Int. Cl.⁷ ........................ C08F 220/06; C08F 220/18
(52) U.S. Cl. ........................ 524/425; 524/427; 524/413; 106/465; 523/333; 526/304; 526/307
(58) Field of Search .............................. 524/425, 427, 524/413; 106/465; 523/333; 526/304, 307

(56) References Cited

U.S. PATENT DOCUMENTS

| | | | |
|---|---|---|---|
| 4,840,985 A | * | 6/1989 | Gonnet et al. ............... 524/425 |
| 5,278,248 A | | 1/1994 | Egraz et al. |
| 5,880,085 A | | 3/1999 | Kensicher et al. |
| 5,880,237 A | * | 3/1999 | Howland et al. ........... 526/304 |
| 5,891,972 A | * | 4/1999 | Egraz et al. ................ 526/233 |
| 6,048,916 A | * | 4/2000 | Hirata et al. ................ 524/5 |

FOREIGN PATENT DOCUMENTS

| | | |
|---|---|---|
| EP | 0 003 235 | 8/1979 |
| EP | 0 028 886 | 5/1981 |
| EP | 0 184 894 | 6/1986 |
| EP | 0 248 612 | 12/1987 |
| EP | 0 567 214 | 10/1993 |
| EP | 0 870 784 | 10/1998 |
| EP | 0 892 020 | 1/1999 |

OTHER PUBLICATIONS

U.S. Appl. No. 10/450,454, filed Jun. 19, 2003, Mongoin et al.
U.S. Appl. No. 10/030,988, filed Apr. 12, 2002, Dupont et al.
U.S. Appl. No. 10/070,424, filed Jul. 30, 2002, Suau et al.
U.S. Appl. No. 10/311219, filed Dec. 16, 2002, Suau et al.
U.S. Appl. No. 10/322,522, filed Dec. 19, 2002, Egraz et al.
U.S. Appl. No. 10/168,389, filed Jun. 21, 2001, Suau et al.

* cited by examiner

Primary Examiner—Tatyana Zalukaeva
Assistant Examiner—Satya Sastri
(74) Attorney, Agent, or Firm—Oblon, Spivak, McClelland, Maier & Neustadt, P.C.

(57) ABSTRACT

The invention relates to the use of a slightly anionic and water-soluble copolymer, as a dispersing agent and/or an agent for assisting the grinding of pigments and/or mineral fillers in aqueous suspension giving on the one hand a low Zeta potential to the aqueous suspensions of the said fillers and/or pigments and on the other hand affording an electrosteric stabilisation of the said suspensions.

The invention also relates to the said aqueous suspensions of mineral pigments and/or fillers and their uses in the fields of paper, such as the manufacture or coating of paper, and drilling muds used for petroleum prospecting or extraction.

The invention also relates to the use of the said dispersing agents and/or agent for assisting the grinding in the field of paints and plastic materials such as thermoplastic or thermosetting resins.

96 Claims, No Drawings

USE OF WEAKLY ANIONIC COPOLYMERS AS DISPERSING AND/OR GRINDING AID AGENT OF AN AQUEOUS SUSPENSION OF MINERAL MATERIALS

The present invention relates to the technical sector of mineral fillers, notably for papermaking applications, and their appropriate processing in order to improve either the method of manufacturing the paper sheet, or its properties.

The invention firstly relates to the use of a slightly anionic and water-soluble copolymer as a dispersing agent and/or an aid to the grinding of mineral pigments and/or fillers in aqueous suspension giving on the one hand a low Zeta potential to the aqueous suspensions of the said fillers and/or pigments and on the other hand affording electro-steric stabilisation of the said suspensions.

The invention also relates to the said slightly anionic water-soluble agent, dispersing agent and/or aid to the grinding of mineral pigments and/or fillers in aqueous suspension giving on the one hand a low Zeta potential to the aqueous suspensions of the said fillers and/or pigments and on the other hand affording electro-steric stabilisation of the said suspensions.

The invention also relates to the said aqueous suspensions of mineral pigments and/or fillers and the uses thereof notably in the fields of paper, such as amongst other things the manufacture or coating of the paper, with the obtaining in particular of equal or better properties for the sheet, and notably opacity, gloss or printability, or notably in the field of drilling muds used in prospecting for oil or in oil extraction. The invention also concerns the use of the said slightly anionic water-soluble dispersing agent and/or aid to the grinding in the fields of paints or plastic materials such as thermoplastic or thermosetting resins. Then, the invention relates to the manufactured papers and/or coated papers with the use of the said aqueous suspensions of mineral pigments and/or fillers as well as relates to the drilling muds containing the said aqueous suspensions of mineral pigments and/or fillers.

This is because, in the manufacture of paper, it is becoming more and more usual to replace some of the cellulose fibres, which are expensive, with mineral fillers and/or pigments, which are less expensive, in order to reduce the cost of the paper whilst improving, for example, its opacity, its whiteness or its properties of printability.

The mineral fillers and/or pigments such as, for example, natural or synthetic calcium carbonate, dolomites, magnesium hydroxide, kaolin, talc, gypsum, titanium oxide or aluminium hydroxide are normally incorporated in the sheet of paper during its formation on the wire.

This is achieved by incorporating the mineral filler and/or pigment, either in powder form or in aqueous suspension, in the papermaking pulp in such a way that the pulp is drained onto the wire and the particles of mineral fillers and/or pigments in suspension are retained in the fibrous sheet obtained. Since this retention is not complete, this leads the papermaker to use chemical additives and the manufacturers of fillers to use surface treatment agents for these mineral materials.

Likewise, when the sheet of paper is treated by coating, the papermaker uses, in his formulation, mineral materials generally put in suspension, either by the papermaker himself or by the manufacturer, using anionic additives such as for example polyacrylates or polyphosphates or others or using cationic additives such as for example cationised polyacrylates or polymethacrylates such as quaternary dimethylaminoethyl methacrylates or melamine-formaldehyde resins, epichlorhydrine resins, dicyandiamide resins or others.

Thus the skilled man in the art knows agents assisting grinding or water-soluble dispersing agents (FR 2 488 814, FR 2 603 042, EP 0 100 947, EP 0 100 948, EP 0 129 329, EP 0 542 643, EP 0 542 644) consisting of polymers and/or copolymers of the anionic type for producing aqueous suspensions of mineral pigments and/or fillers. However, these have the drawback of requiring the addition of cationic compounds during the process of manufacturing the sheet of paper when they are used in these sheet manufacturing operations, and result in coated papers with an opacity which does not meet the opacity required by the final use when they are used in paper coating operations.

Moreover, the skilled man in the art knows agents for assisting grinding or water-soluble dispersing agents (EP 0 281 134, EP 0 307 795) consisting of polymers and/or copolymers of the cationic type for producing aqueous suspensions of mineral pigments and/or fillers which present the major risk of incompatibility with any anionic medium present in the papermaking formulations, which may go as far as the caking of the medium, thus blocking production entirely.

Another solution is known to the skilled man in the art for arriving at aqueous suspensions of mineral pigments and/or fillers which are stable over time and have a high concentration of dry matter at the same time as a fine particle size.

This solution (WO 91/09067) consists in using amphoteric water-soluble copolymers as a weakly anionic water-soluble dispersing agent and/or aid to the grinding of pigments and/or mineral fillers. However, such copolymers have the drawback of being sensitive to the pH and ionic strength of the medium and also being easily hydrolysable.

Thus the skilled man in the art is confronted with the problem of obtaining aqueous suspensions of mineral fillers and/or pigments which are refined, stable over time, with a moderate to high concentration of mineral material, which do not present any risk of incompatibility in papermaking formulations, only slightly sensitive to the pH and ionic strength of the media used in papermaking formulations and to the problem of obtaining suspensions making it possible to arrive at sheet properties meeting the criteria of the final user, a problem which none of the solutions available to him completely resolve.

Bearing in mind the aforementioned drawbacks concerning anionic or cationic aqueous suspensions or aqueous suspensions obtained by means of amphoteric agents, the Applicant unexpectedly found that the presence in the copolymer of at least one monomer of formula (I)

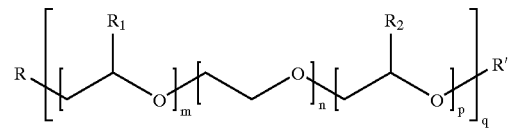

in which m and p represent a number of alkylene oxide units less than or equal to 150, n represents a number of ethylene oxide units less than or equal to 150, q represents a number at least equal to 1 and such that $5 \leq (m+n+p)q \leq 150$ $R_1$ is hydrogen or the methyl or ethyl radical $R_2$ is hydrogen or the methyl or ethyl radical R represents the polymerisable unsaturated radical, belonging to the group of acrylic, methacrylic, maleic, itaconic, crotonic or vinylphthalic esters and unsaturated urethanes such as for example acrylurethane, methacrylurethane, α-α' dimethylisopropenyl benzylurethane or allylurethane, and to the group of allyl or vinyl ethers or to the group of ethylenlcally unsaturated amides, R' represents a hydrocarbon radical having 1 to 5 carbon atoms made possible the development of weakly anionic water-soluble copolymers allowing electro-steric stabilisation thus resulting in the obtaining of aqueous suspensions of mineral pigments and/or fillers resolving the problems set out above, that is to say resulting, notably, in the obtaining of aqueous suspensions of mineral pigments and/or fillers with a moderate to high mineral matter content, stable over time, without sedimentation, only slightly sensitive to the pH and ionic strength of the media used in the papermaking or petroleum formulations, and having a low Zeta potential.

Thus the prior art essentially describes dispersing agents and/or grinding aid agents which are anionic, cationic or amphoteric or weakly anionic and water-soluble.

In fact European patent application EP 0 870 784 describes slightly anionic agents, but these agents give aqueous suspensions with a high Zeta potential and do not resolve the problem posed for the final user.

Thus, according to the invention, the dispersing agent and/or grinding aid agent is distinguished from the prior art in that it is composed of a) at least one anionic monomer with a monocarboxylic function b) possibly at least one anionic monomer with a dicarboxylic function or with a sulphonic or phosphoric or phosphonic function or a mixture thereof c) at least one non-ionic monomer, the non-ionic monomer consisting of at least one monomer of formula (I):

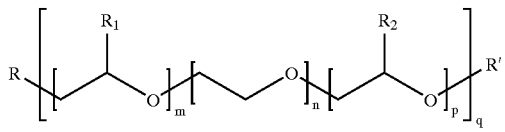

in which m and p represent a number of alkylene oxide units less than or equal to 150, n represents a number of ethylene oxide units less than or equal to 150, q represents a number at least equal to 1 and such that $$5 \leq (m+n+p)q \leq 150$$

$R_1$ is hydrogen or the methyl or ethyl radical $R_2$ is hydrogen or the methyl or ethyl radical R represents the polymerisable unsaturated radical, belonging to the group of acrylic, methacrylic, maleic, itaconic, crotonic or vinylphthalic esters and unsaturated urethanes such as for example acrylurethane, methacrylurethane, α-α' dimethylisopropenyl benzylurethane or allylurethane, and to the group of allyl or vinyl ethers or to the group of ethylenically unsaturated amides, R' represents a hydrocarbon radical having 1 to 5 carbon atoms d) possibly a monomer of the acrylamide or methacrylamide type or derivatives thereof and mixtures thereof or one or more non water-soluble monomers such as alkyl acrylates or methacrylates, vinyl compounds such as vinyl acetate, vinylpyrrolidone, styrene, alphamethylstyrene and derivatives thereof, and e) possibly at least one monomer having at least two unsaturated ethylenic chains referred to in the remainder of the application as across-linking monomer giving the properties of low Zeta potential and electrosteric stability to the suspensions.

These aims are achieved by means of the use, as a dispersing agent and/or a grinding aid agent, of a copolymer consisting of:

a) at least one anionic monomer with an unsaturated ethylenic chain and with a monocarboxylic function b) possibly at least one anionic monomer with an unsaturated ethylenic chain and a dicarboxylic or sulphonic or phosphoric or phosphonic function or a mixture thereof c) at least one non-ionic monomer of formula (I) and d) possibly a monomer of the acrylamide or methacrylamide type or derivatives thereof and mixtures thereof or one or more non water-soluble monomers with unsaturated ethylenic chains such as alkyl acrylates or methacrylates, vinyl compounds such as vinyl acetate, vinylpyrrolidone, styrene, alphamethylstyrene and derivatives thereof, e) possibly at least one cross-linking monomer the total of constituents a), b), c), d) and e) being equal to 100%, with moreover the obligatory presence of a monomer of type a) in order to be able to ensure the dispersion of the mineral materials with a high and medium concentration of dry matter and the obligatory presence of a monomer of type c) in combination with the monomer of type a) in order to ensure the electro-steric stabilisation of the aqueous suspensions of mineral materials with a high and medium concentration of dry matter.

The use according to the invention of a weakly anionic and water-soluble copolymer as a dispersing agent and/or a grinding aid agent for mineral pigments and/or fillers in aqueous suspension is characterised in that the said copolymer consists of:

a) at least one anionic monomer with an unsaturated ethylenic chain and a monocarboxylic function chosen from amongst the monomers with an unsaturated ethylenic chain and a monocarboxylic function such as acrylic or methacrylic acid or diacid hemiesters such as the $C_1$ to $C_4$ monoesters of maleic or itaconic acids, or mixtures thereof, b) possibly at least one anionic monomer with an unsaturated ethylenic chain and a dicarboxylic or sulphonic or phosphoric or phosphonic function or a mixture thereof chosen from amongst monomers with an unsaturated ethylenic chain and a dicarboxylic function such as crotonic, isocrotonic, cinnamic, itaconic, maleic or citraconic acid or carboxylic acid anhydrides, such as maleic anhydride, or chosen from amongst monomers with an unsaturated ethylenic chain and a sulphonic function such as acrylamidomethylpropane sulphonic acid, sodium methallylsulphonate, vinyl sulphonic acid and styrene sulphonic acid or chosen from amongst the monomers with an unsaturated ethylenic chain and a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates or chosen from amongst the monomers with an unsaturated ethylenic chain and a phosphonic function such as phosphonic vinyl acid, or mixtures thereof c) at least one non-ionic monomer with an

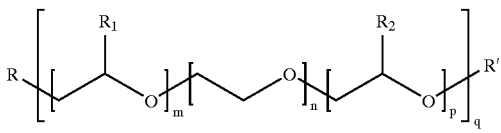

unsaturated ethylenic chain of formula (I):
in which
m and p represent a number of alkylene oxide units less than or equal to 150,
n represents a number of ethylene oxide units less than or equal to 150,
q represents a number at least equal to 1 and such that $$5 \leq (m+n+p)q \leq 150$$

$R_1$ is hydrogen or the methyl or ethyl radical
$R_2$ is hydrogen or the methyl or ethyl radical
R represents the polymerisable unsaturated radical, belonging to the group of acrylic, methacrylic, maleic, itaconic, crotonic or vinylphthalic esters and unsaturated urethanes such as for example acrylurethane, methacrylurethane, $\alpha$-$\alpha'$ dimethylisopropenyl benzylurethane or allylurethane, and to the group of allyl or vinyl ethers or to the group of ethylenically unsaturated amides,
R' represents a hydrocarbon radical having 1 to 5 carbon atoms d) possibly a monomer of the acrylamide or methacrylamide type or derivatives thereof and mixtures thereof or one or more non water-soluble monomers such as alkyl acrylates or methacrylates, vinyl compounds such as vinyl acetate, vinylpyrrolidone, styrene, alphamethylstyrene and derivatives thereof, and e) possibly at least one cross-linking monomer chosen non-limitatively from the group consisting of ethylene glycol dimethacrylate, trimethylolpropanetriacrylate, allyl acrylate, allyl maleates, methylenebisacrylamide, methylenebismethacrylamide, tetrallyloxyethane, the triallylcyanurates, and the allyl ethers obtained from polyols such as pentaerythritol, sorbitol, sucrose and others, the total of constituents a), b), c), d) and e) being equal to 100% and in that the said copolymer has a specific viscosity of no more than 10, preferably no more than 5 and highly preferentially no more than 2.

More particularly the use of the aforementioned copolymer is characterised in that the said copolymer consists, expressed by weight, of:

a) 2% to 85% and even more particularly 2% to 80% of at least one anionic monomer with an unsaturated ethylenic chain and a monocarboxylic function chosen from amongst the monomers with an unsaturated ethylenic chain and a monocarboxylic function such as acrylic or methacrylic acid or the hemiesters of diacids such as the $C_1$ to $C_4$ monoesters of maleic or itaconic acids, or mixtures thereof, b) from 0% to 80% and even more particularly from 0% to 50% and very particularly from 0% to 20% of at least one anionic monomer with an unsaturated ethylenic chain and a dicarboxylic or sulphonic or phosphoric or phosphonic function or a mixture thereof chosen from amongst monomers with an unsaturated ethylenic chain and a dicarboxylic function such as crotonic, isocrotonic, cinnamic, itaconic, maleic or citraconic acid or carboxylic acid anhydrides, such as maleic anhydride, or chosen from amongst monomers with an unsaturated ethylenic chain and a sulphonic function such as acrylamido-methyl-propane sulphonic acid, sodium methallylsulphonate, vinyl sulphonic acid and styrene sulphonic acid or chosen from amongst the monomers with an unsaturated ethylenic chain and a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates or chosen from amongst the monomers with an unsaturated ethylenic chain and a phosphonic function such as phosphonic vinyl acid, or mixtures thereof c) from 20% to 95% of at least one monomer with an unsaturated ethylenic chain of formula (I):

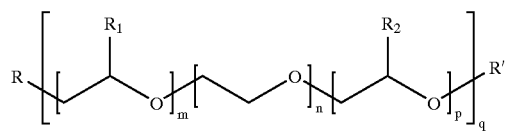

in which
m and p represent a number of alkylene oxide units less than or equal to 150,
n represents a number of ethylene oxide units less than or equal to 150,
q represents a number at least equal to 1 and such that $$5 \leq (m+n+p)q \leq 150$$

$R_1$ is hydrogen or the methyl or ethyl radical
$R_2$ is hydrogen or the methyl or ethyl radical
R represents the polymerisable unsaturated radical, belonging to the group of acrylic, methacrylic, maleic, itaconic, crotonic or vinylphthalic esters and unsaturated urethanes such as for example acrylurethane, methacrylurethane, $\alpha$-$\alpha'$ dimethylisopropenyl benzylurethane or allylurethane, and to the group of allyl or vinyl ethers or to the group of ethylenically unsaturated amides,
R' represents a hydrocarbon radical having 1 to 5 carbon atoms d) from 0% to 50% of a monomer of the acrylamide or methacrylamide type or derivatives thereof and mixtures thereof or one or more non water-soluble monomers such as alkyl acrylates or methacrylates, vinyl compounds such as vinyl acetate, vinylpyrrolidone, styrene, alphamethylstyrene and derivatives thereof, and e) from 0% to 3% of at least one cross-linking monomer chosen non-limitatively from the group consisting of ethylene glycol dimethacrylate, trimethylolpropanetriacrylate, allyl acrylate, allyl maleates, methylenebisacrylamide, methylenebismethacrylamide, tetrallyloxyethane, the triallylcyanurates, or the allyl ethers obtained from polyols such as pentaerythritol, sorbitol, sucrose or others, the total of constituents a), b), c), d) and e) being equal to 100% and in that the said copolymer has a specific viscosity of no more than 10, preferably no more than 5 and highly preferentially no more than 2.

Even more preferentially, the use of the copolymer is characterised in that a) the anionic monomer with unsaturated ethylenic chains and monocarboxylic function is preferably chosen from amongst the monomers with an unsaturated ethylenic chain and a monocarboxylic function such as acrylic or methacrylic acid, b) the anionic monomer with an unsaturated ethylenic chain and a dicarboxylic or sulphonic or phosphoric or phosphonic function or a mixture thereof is preferably chosen from amongst the monomers with an unsaturated ethylenic chain and a dicarboxylic function such as diacids including itaconic or maleic acid or chosen from amongst the monomers with an unsaturated ethylenic chain and a sulphonic function such as acrylamido-methyl-propanesulphonic acid, sodium methallylsulphonate, vinyl sulphonic acid and styrene sulphonic acid or chosen from amongst the monomers with an unsaturated ethylenic chain and a phosphoric function such as ethylene glycol methacrylate phosphate, propylene glycol methacrylate phosphate, ethylene glycol acrylate phosphate, propylene glycol acrylate phosphate and their ethoxylates or mixtures thereof c) the non-ionic monomer with an unsaturated ethylenic chain of formula (I) is such that $R_1$ represents hydrogen or the methyl or ethyl radical $R_2$ represents hydrogen or the methyl or ethyl radical R represents the polymerisable unsaturated radical, belonging to the group of acrylic, methacrylic, maleic, itaconic, crotonic or vinylphthalic esters as well as unsaturated urethanes such as for example acrylurethane, methacrylurethane, $\alpha$-$\alpha'$ dimethylisopropenyl benzylurethane, allylurethane, and to the group of allyl or vinyl ethers or to the group of ethylenically unsaturated amides, R' represents a hydrocarbon radical having 1 to 5 carbon atoms d) the monomer of the acrylamide or methacrylamide type or derivatives thereof is chosen from amongst acrylamide or methacrylamide, and the non water-soluble monomer is chosen from amongst ethyl acrylate or styrene e) the cross-linking agent is chosen from amongst the group consisting of ethylene glycol dimethacrylate, trimethylolpropanetriacrylate, allyl acrylate, the allyl maleates, methylenebisacrylamide, methylenebismethacrylamide, tetrallyloxyethane, the triallylcyanurates, the allyl ethers obtained from polyols such as pentaerythritol, sorbitol, sucrose or others.

The copolymer used according to the invention is obtained by known methods of radical copolymerisation in solution, in direct or reverse emulsion, in suspension or precipitation in suitable solvents, in the presence of catalytic systems and known transfer agents.

This copolymer obtained in acid form and possibly distilled can also be partially or completely neutralised by one or more neutralisation agents having a monovalent neutralising function or a polyvalent neutralising function such as for example, for the monovalent function, those chosen from the group consisting of alkali cations, in particular sodium, potassium, lithium, ammonium or the aliphatic and/or cyclic primary, secondary or tertiary amines such as for example stearylamine, the ethanolamines (mono-, di, triethanolamine), mono and diethylamine, cyclohexylamine, methylcyclohexylamine or, for the polyvalent function, those chosen from the group consisting of alkaline-earth divalent cations, in particular magnesium and calcium, or zinc, also consisting of trivalent cations, in particular aluminium, or certain cations with a higher valency.

Each neutralisation agent then acts according to the degrees of neutralisation peculiar to each valency function.

According to another variant, the copolymer resulting from the copolymerisation reaction can, possibly before or after the complete or partial neutralisation reaction, be treated and separated into several phases, according to static or dynamic methods known to experts, by means of one or more polar solvents belonging notably to the group consisting of water, methanol, ethanol, propanol, isopropanol, the butanols, acetone, tetrahydrofuran or mixtures thereof.

One of the phases then corresponds to the copolymer used according to the invention as a dispersing agent and/or a grinding aid agent for mineral materials in aqueous suspension.

The specific viscosity of the copolymer is symbolised by the letter $\eta$ and is determined as follows:

A solution of polymerisate is taken so as to obtain a solution corresponding to 2.5 g of dry polymer neutralised with soda and to 50 ml of a solution of bipermuted water. Then, with a capillary viscometer with a Baume constant of 0.000105 placed in a bath thermostatically controlled at 25° C., a measurement is made of the run-out time for a given volume of the aforementioned solution containing the copolymer, and the run-out time for the same volume of the solution of bipermuted water without the said copolymer. It is then possible to define the specific viscosity $\eta$ by means of the following equation:

$$\eta = \frac{(\text{run-out time of the polymer solution}) - (\text{run-out time of the permuted water solution})}{(\text{run-out time of the permuted water solution})}$$

The capillary tube is generally chosen so that the run-out time of the permuted water solution with no copolymer is approximately 60 to 100 seconds, thus giving specific viscosity measurements with very good precision.

The invention also relates to the said water-soluble, weakly anionic agent, dispersing agent and/or grinding aid agent for pigments and/or mineral fillers in aqueous suspension giving on the one hand a low Zeta potential to the aqueous suspensions of the said fillers and/or pigments and on the other hand affording an electro-steric stabilisation of the said suspensions. This agent is characterised in that it is the previously described copolymer.

The aqueous suspensions of fillers and/or pigments according to the invention are characterised in that they contain the said agent and more particularly in that they contain from 0.05% to 5% by dry weight of the said agent with respect to the total dry weight of the fillers and/or pigments, and even more particularly 0.3% to 1.0% by dry weight of the said agent with respect to the total dry weight of the fillers and/or pigments.

They are also characterised in that the filler and/or pigment is chosen from amongst natural calcium carbonate such as notably calcite, chalk or marble, synthetic calcium carbonate named precipitated calcium carbonate, dolomites, magnesium hydroxide, kaolin, talc, gypsum, titanium oxide, or aluminium hydroxide or any other filler and/or pigment normally used in the papermaking or petroleum field.

Finally, they are characterised in that they are only slightly sensitive to the pH and ionic strength of the media and in that they have a low Zeta potential, that is to say a Zeta potential of between 0 and −30 mV and preferentially between 0 and −20 mV.

The papers manufactured and/or coated according to the invention are characterised in that they contain the said aqueous suspensions of fillers and/or pigments according to the invention.

The drilling muds according to the invention are characterised in that they contain the said aqueous suspensions of fillers and/or pigments according to the invention.

In practice, the dispersing operation, also referred to as the operation of dispersing the mineral filler to be dispersed, can be effected in two different ways.

One of the ways consists in effecting, under agitation, the preparation of a suspension of mineral filler and/or pigment by introducing all or part of the dispersing agent according to the invention into the aqueous phase, and then the mineral material, so as to obtain an aqueous suspension with a moderate to high mineral material content, stable over time, without sedimentation, only slightly sensitive to the pH and ionic strength of the media used in the papermaking formulations, and having a low Zeta potential, that is to say a Zeta potential of between 0 and −30 mV and preferentially between 0 and −20 mV.

Another way consists in preparing the suspension of mineral filler and/or pigment by introducing into the mineral filler and/or pigment cake all the quantity of dispersing agent to be tested so as to obtain an aqueous suspension with a moderate to high mineral material content, stable over time, without sedimentation, only slightly sensitive to the pH and ionic strength of the media used in the papermaking formulations, and having a low Zeta potential, that is to say a Zeta potential of between 0 and −30 mV and preferentially between 0 and −20 mV.

This dispersing operation can follow on from the grinding operation described below or can be implemented completely independently.

Thus, in practice, the operation of grinding the mineral material to be refined consists in grinding the mineral substance with a grinding substance of very fine particles in an aqueous medium containing the grinding aid agent.

To the aqueous suspension of the mineral substance to be ground, the grinding substance with a particle size advantageously between 0.20 and 4 millimetres is added. The grinding substance is generally in the form of particles of materials which are as diverse as silicon oxide, aluminium oxide, zirconium oxide or mixtures thereof, and synthetic resins with high hardness, steels, or others. An example of the composition of such grinding substances is given by the patent FR 2 303 681, which describes the grinding element formed by 30% to 70% by weight zirconium oxide, 0.1% to 5% aluminium oxide and 5% to 20% silicon oxide.

The grinding substance is preferably added to the suspension in a quantity such that the ratio by weight between this grinding material and the mineral substance to be ground is at least 2/1, this ratio preferably being between the limits 3/1 and 5/1.

The mixture of the suspension and grinding substance is then subjected to the mechanical action of stirring, such as the one which occurs in a conventional grinder with microelements.

The time required for achieving the required fineness of the mineral substance after grinding varies according to the nature and quantity of the mineral substances to be ground, and according to the stirring mode used and the temperature of the medium during the grinding operation.

The aqueous suspensions thus obtained can be used in the field of paper in mass filling or in coating with a low Zeta potential.

During the manufacture of the sheet of paper, that is to say during their use as a mass filler, these suspensions can be used with the coating broke.

They can also be used in the field of drilling muds such as for example soft bentonitic muds, saturated salt muds and sea-water muds.

The scope and interest of the invention will be perceived more clearly by means of the following examples, which are not limitative.

EXAMPLE 1

This example relates to the preparation of a calcium carbonate suspension by simple dispersion and the revealing of the properties afforded by the presence of at least one monomer of formula (I) in the non-ionic monomer.

To this end, for each of the following tests, carried out using a marble filtration cake in which 73% of the particles have a diameter less than 1 micrometre determined by measurement using the Sedigraph™ 5100 from Micromeritics, the aqueous suspension of marble is prepared by the introduction, into the cake, of the necessary quantity by dry weight of dispersion agent to be tested with respect to the dry weight of the said cake to be put in suspension in order to obtain an aqueous suspension of calcium carbonate with a dry matter concentration of 61%.

After 20 minutes stirring, a sample of the suspension of calcium carbonate obtained is recovered in a flask and the Brookfield™ viscosity is measured by means of a Brookfield™ type RVT viscometer, at a temperature of 25° C. and a speed of rotation of 10 and 100 revolutions per minute with the appropriate spindle.

After a time of 8 days in the flask, the Brookfield™ viscosity of the suspension is measured by introducing, into the unstirred flask, the appropriate spindle of the Brookfield™ type RVT viscometer, at a temperature of 25° C. and a speed of rotation of 10 revolutions and 100 revolutions per minute (BS viscosity Brookfield™ viscosity before stirring).

The same Brookfield™ viscosity measurements are also made once the flask has been stirred and constitute the results of Brookfield™ viscosity after stirring (AS viscosity).

For measuring the Zeta potential, a sample of the suspension of calcium carbonate obtained is also recovered, after the 20 minutes of stirring, and a few drops of this is dispersed in a sufficient quantity of serum obtained by mechanical filtration of the said suspension in order to obtain a colloidal suspension which is scarcely cloudy.

This suspension is introduced into the measuring cell of the Zetamaster S Zetameter from Malvern, which directly displays the value of the Zeta potential in mV.

These different measurements were carried out for the following tests.

Test N° 1:

This test, illustrating the prior art, used 0.7% by dry weight of a sodium polyacrylate with a specific viscosity of 4.80.

Test N° 2:

This test, illustrating the prior art, used 0.7% by dry weight of an acrylic acid-maleic anhydride copolymer completely neutralised with soda and with a specific viscosity of 1.38.

Test N° 3:

This test, illustrating a field outside the invention, used 0.7% by dry weight of a homopolymer, with a specific viscosity of 0.91 and whose single monomer is a monomer of formula (I) in which:

$R_1$ represents hydrogen $R_2$ represents hydrogen

R represents the methacrylate group

R' represents the methyl radical with (m+n+p)q=45.

Test N° 4:

This test, illustrating the invention, used 0.7% by dry weight of a polymer fully neutralised with soda, with a specific viscosity of 1.28 and consisting of:

a) 8.0% by weight acrylic acid as an anionic monomer with a monocarboxylic function b) 5.5% by weight ethylene glycol methacrylate phosphate as an anionic monomer with a phosphoric function c) 82.0% by weight of a monomer of formula (I) in which:

$R_1$ represents hydrogen $R_2$ represents hydrogen

R represents the methacrylurethane group

R' represents the methyl radical d) 4.5% by weight ethyl acrylate with (m+n+p)q=113.

Test N° 5:

This test, illustrating the invention, used 0.7% by dry weight of a polymer fully neutralised with soda, with a specific viscosity of 0.78 and consisting of:

a) 8.0% by weight acrylic acid as an anionic monomer with a monocarboxylic function b) 5.5% by weight ethylene glycol methacrylate phosphate as an anionic monomer with a phosphoric function c) 75.0% by weight of a monomer of formula (I) in which $R_1$ represents hydrogen $R_2$ represents hydrogen R represents the methacrylurethane group R' represents the methyl radical d) 11.5% by weight ethyl acrylate with (m+n+p)q=40.

Test N° 6:

This test, illustrating the invention, used 0.7% by dry weight of a polymer fully neutralised with soda, with a specific viscosity of 0.51 and consisting of:

a) 8.0% by weight acrylic acid as an anionic monomer with a monocarboxylic function b) 5.5% by weight ethylene glycol methacrylate phosphate as an anionic monomer with a phosphoric function c) 71.0% by weight of a monomer of formula (I) in which $R_1$ represents hydrogen $R_2$ represents hydrogen R represents the methacrylurethane group R' represents the methyl radical d) 15.5% by weight ethyl acrylate with (m+n+p)q=25.

Test N° 7:

This test, illustrating the invention, used 0.7% by dry weight of a polymer fully neutralised with soda, with a specific viscosity of 0.51 and consisting of:

a) 8.0% by weight acrylic acid as an anionic monomer with a monocarboxylic function b) 5.5% by weight ethylene glycol methacrylate phosphate as an anionic monomer with a phosphoric function c) 67.0% by weight of a monomer of formula (I) in which $R_1$ represents hydrogen $R_2$ represents hydrogen R represents the methacrylurethane group R' represents the methyl radical d) 19.5% by weight ethyl acrylate with (m+n+p)q=17.

Test N° 8:

This test, illustrating the invention, used 0.6% by dry weight of a polymer fully neutralised with soda, with a specific viscosity of 1.56 and consisting of:

a) 2.0% by weight methacrylic acid as an anionic monomer with a monocarboxylic function b) 13.0% by weight ethylene glycol methacrylate phosphate as an anionic monomer with a phosphoric function c) 85.0% by weight of a monomer of formula (I) in which $R_1$ represents hydrogen $R_2$ represents hydrogen R represents the methacrylate group R' represents the methyl radical with (m+n+p)q=113.

Test N° 9:

This test, illustrating the invention, used 0.6% by dry weight of a polymer fully neutralised with soda, with a specific viscosity of 0.97 and consisting of:

a) 3.2% by weight methacrylic acid as an anionic monomer with a monocarboxylic function b) 13.5% by weight ethylene glycol methacrylate phosphate as an anionic monomer with a phosphoric function c) 83.3% by weight of a monomer of formula (I) in which $R_1$ represents hydrogen $R_2$ represents hydrogen R represents the methacrylate group R' represents the methyl radical with (m+n+p)q=45.

Test N° 10:

This test, illustrating the invention, used 0.6% by dry weight of a polymer fully neutralised with soda, with a specific viscosity of 0.96 and consisting of:

a) 8.5% by weight methacrylic acid as an anionic monomer with a monocarboxylic function b) 13.5% by weight ethylene glycol methacrylate phosphate as an anionic monomer with a phosphoric function c) 78.0% by weight of a monomer of formula (I) in which $R_1$ represents hydrogen $R_2$ represents hydrogen R represents the methacrylate group R' represents the methyl radical with (m+n+p)q=17.

Test N° 11:

This test, illustrating the invention, used 0.6% by dry weight of a polymer fully neutralised with soda, with a specific viscosity of 1.07 and consisting of:

a) 17.0% by weight methacrylic acid as an anionic monomer with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

Test N° 12:

This test, illustrating the invention, used 0.7% by dry weight of a polymer fully neutralised with soda, with a specific viscosity of 1.04 and consisting of:

a) 3.2% by weight methacrylic acid and 13.0% by weight acrylic acid as anionic monomers with a monocarboxylic function b) 8.0% by weight acrylamido methyl propanesulphonic acid as an anionic monomer with a sulphonic function c) 75.8% by weight of a monomer of formula (I) in which
R$_1$ represents hydrogen
R$_2$ represents hydrogen
R represents the methacrylate group
R' represents the methyl radical
with (m+n+p)q=45.

Test N° 13:
This test, illustrating the invention, used 0.7% by dry weight of a polymer fully neutralised with soda, with a specific viscosity of 1.47 and consisting of:
a) 3.3% by weigh methacrylic acid and 13.0% by weight acrylic acid as anionic monomers with a monocarboxylic function
b) 5.0% by weight itaconic acid as an anionic monomer with a dicarboxylic function
c) 78.7% by weight of a monomer of formula (I) in which
R$_1$ represents hydrogen
R$_2$ represents hydrogen
R represents the methacrylate group
R' represents the methyl radical
with (m+n+p)q=45.

Test N° 14:
This test, illustrating the invention, used 0.7% by dry weight of a polymer fully neutralised with soda, with a specific viscosity of 1.38 and consisting of:
a) 0.8% by weight methacrylic acid and 79.3% by weight acrylic acid as anionic monomers with a monocarboxylic function
b) 19.9% by weight of a monomer of formula (I) in which
R$_1$ represents hydrogen
R$_2$ represents hydrogen
R represents the methacrylate group
R' represents the methyl radical
with (m+n+p)q=45.

Test N° 15:
This test, illustrating the invention, used 0.7% by dry weight of a polymer fully neutralised with soda, with a specific viscosity of 1.38 and consisting of:
a) 0.4% by weight methacrylic acid and 79.6% by weight acrylic acid as anionic monomers with a monocarboxylic function
b) 20.0% by weight of a monomer of formula (I) in which
R$_1$ represents hydrogen
R$_2$ represents hydrogen
R represents the methacrylate group
R' represents the methyl radical
with (m+n+p)q=113.

Test N° 16:
This test, illustrating the invention, used 0.7% by dry weight of a polymer fully neutralised with soda, with a specific viscosity of 1.28 and consisting of:
a) 35.0% by weight acrylic acid as anionic monomers with a monocarboxylic function
b) 20.0% by weight of a monomer of formula (I) in which
R$_1$ represents hydrogen
R$_2$ represents hydrogen
R represents the methacrylurethane group
R' represents the methyl radical
c) 45.0% by weight acrylamide
with (m+n+p)q=17.

Test N° 17:
This test, illustrating the invention, used 0.7% by dry weight of a polymer fully neutralised with soda, with a specific viscosity of 1.03 and consisting of:
a) 35.0% by weight acrylic acid as an anionic monomer with a monocarboxylic function
b) 20.0% by weight of a monomer of formula (I) in which
R$_1$ represents hydrogen
R$_2$ represents hydrogen
R represents the methacrylate group
R' represents the methyl radical
c) 45.0% by weight acrylamide
with (m+n+p)q=45.

Test N° 18:
This test, illustrating the invention, used 0.7% by dry weight of a polymer fully neutralised with soda, with a specific viscosity of 1.65 and consisting of:
a) 15.0% by weight methacrylic acid and 12.0% by weight acrylic acid as anionic monomers with a monocarboxylic function
b) 73.0% by weight of a monomer of formula (I) in which
R$_1$ represents hydrogen
R$_2$ represents hydrogen
R represents the methacrylate group
R' represents the methyl radical
with (m+n+p)q=8.

Test N° 19:
This test, illustrating the invention, used 0.7% by dry weight of a polymer fully neutralised with soda, with a specific viscosity of 1.38 and consisting of:
a) 3.4% by weight methacrylic acid and 13.5% by weight acrylic acid as anionic monomers with a monocarboxylic function
b) 82.1% by weight of a monomer of formula (I) in which
R$_1$ represents hydrogen
R$_2$ represents hydrogen
R represents the methacrylate group
R' represents the methyl radical
c) 1.0% by weight EDMA as a cross-linking monomer
with (m+n+p)q=45.

Test N° 20:
This test, illustrating the invention, used 0.7% by dry weight of a polymer fully neutralised with soda, with a specific viscosity of 1.16 and consisting of:
a) 3.9% by weight methacrylic acid and 1.1% by weight acrylic acid as anionic monomers with a monocarboxylic function
b) 95.0% by weight of a monomer of formula (I) in which
R$_1$ represents hydrogen
R$_2$ represents hydrogen
R represents the methacrylate group
R' represents the methyl radical
with (m+n+p)q=45.

Test N° 21:
This test, illustrating the invention, used 0.7% by dry weight of a polymer fully neutralised with soda, with a specific viscosity of 1.07 and consisting of:
a) 0.8% by weight methacrylic acid and 79.2% by weight acrylic acid as anionic monomers with a monocarboxylic function
b) 20.0% by weight of a monomer of formula (I) in which
R$_1$ represents hydrogen
R$_2$ represents hydrogen
R represents the methacrylate group
R' represents the methyl radical with (m+n+p)q=45.

Test N° 22:

This test, illustrating the invention, used 0.7% by dry weight of a polymer fully neutralised with soda, with a specific viscosity of 1.28 and consisting of:

a) 1.7% by weight methacrylic acid and 13.2% by weight acrylic acid as anionic monomers with a monocarboxylic function b) 85.6% by weight of a monomer of formula (I) in which $R_1$ represents hydrogen $R_2$ represents hydrogen R represents the methacrylate group R' represents the propyl radical with (m+n+p)q=64.

Test N° 22 bis:

This test, illustrating the invention, used 0.7% by dry weight of a polymer fully neutralised with soda, with a specific viscosity of 0.68 and consisting of:

a) 45% by weight acrylic acid as anionic monomers with a monocarboxylic function b) 35% by weight acrylamido methyl propanesulphonic acid as an anionic monomer with a sulphonic function c) 20% by weight of 2 monomer of formula (I) in which $R_1$ represents hydrogen $R_2$ represents hydrogen R represents the methacrylate group R' represents the methyl radical with (m+n+p)q=17.

All the experimental results are set out in the following Tables 1a to 1d.

TABLE 1a

| | TEST N° | CONSTITUENT MONOMERS | SPECIFIC VISCOSITY | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 0 rev/min | 100 rev/min | 0 rev/min | 100 rev/min | 0 rev/min | 100 rev/min | |
| Prior art | 1 | 100% AA | 4.80 | 1000 | 280 | 6000 | 1500 | 1000 | 300 | −50.6 |
| Prior art | 2 | 70% AA<br>30% Maleic anhydride | 1.38 | 180 | 110 | 2000 | 500 | 400 | 150 | −50.7 |
| Field outside invention | 3 | 100% methoxy PEGM 2000 | 0.91 | 2400 | 1600 | Excessively high non-measurable viscosity | | | | |
| Invention | 4 | 8.0% AA<br>5.5% EGMP<br>82.0% methoxy PEG MU 5000<br>4.5% EA | 1.28 | 4680 | 830 | 2000 | 600 | 1000 | 440 | −20.2 |
| Invention | 5 | 8.0% AA<br>5.5% EGMP<br>75.0% methoxy PEG MU 1800<br>11.5% EA | 0.78 | 3960 | 1044 | 7600 | 960 | 4000 | 840 | −16.8 |
| Invention | 6 | 8.0% AA<br>5.5% EGMP<br>71.0% methoxy PEG MU 1100<br>15.5% EA | 0.51 | 1860 | 455 | 3200 | 1140 | 1450 | 520 | −20.7 |

AA = Acrylic acid.
EA = Ethyl acrylate.
Methoxy PEG MU 1100 = Methoxy polyethylene glycol methacrylurethane with molecular weight 1100.
Methoxy PEGM 2000 = Methoxy polyethylene glycol methacrylate with molecular weight 2000.
EGMP = Ethylene glycol methacrylate phosphate.
Methoxy PEG MU 1800 = Methoxy polyethylene glycol methacrylurethane with molecular weight 1800.
AMPS = Acrylamido-methyl-propane-sulphonic acid.
Methoxy PEG MU 5000 = Methoxy polyethylene glycol methacrylurethane with molecular weight 5000.

TABLE 1b

| | TEST N° | CONSTITUENT MONOMERS | SPECIFIC VISCOSITY | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 7 | 8.0% AA<br>5.5% EGMP<br>67.0% methoxy PEG MU 750<br>19.5% EA | 0.51 | 7600 | 968 | 9300 | 1500 | 7300 | 1540 | −23.3 |
| Invention | 8 | 2.0% MAA<br>13.0% EGMP<br>85.0% methoxy PEGM 5000 | 1.56 | 1800 | 500 | 3200 | 800 | 1300 | 450 | −7.3 |
| Invention | 9 | 3.2% MAA<br>13.5% EGMP<br>83.3% methoxy PEGM 2000 | 0.97 | 750 | 330 | 3000 | 500 | 700 | 240 | −12.6 |

TABLE 1b-continued

|  | TEST N° | CONSTITUENT MONOMERS | SPECIFIC VISCOSITY | INITIAL 10 rev/min | INITIAL 100 rev/min | 8 days BEFORE STIRRING 10 rev/min | 8 days BEFORE STIRRING 100 rev/min | 8 days AFTER STIRRING 10 rev/min | 8 days AFTER STIRRING 100 rev/min | ZETA POTENTIAL (mV) |
|---|---|---|---|---|---|---|---|---|---|---|
| Invention | 10 | 8.5% MAA<br>13.5% EGMP<br>78.0% methoxy PEGM 750 | 0.96 | 1200 | 280 | 5600 | 920 | 1700 | 370 | −25.2 |
| Invention | 11 | 17.0% MAA<br>83.0% methoxy PEGM 2000 | 1.07 | 1700 | 550 | 1360 | 750 | 1980 | 650 | −16.5 |
| Invention | 12 | 3.2% MAA<br>13.0% AA<br>8.0% AMPS<br>75.8% methoxy PEGM 2000 | 1.04 | 2800 | 790 | 3000 | 900 | 2100 | 530 | −18.7 |

AA = Acrylic acid.
EA = Ethyl acrylate.
MAA = Methacrylic acid.
Methoxy PEG MU 750 = Methoxy polyethylene glycol methacrylurethane with molecular weight 750.
Methoxy PEGM 2000 = Methoxy polyethylene glycol with molecular weight 2000.
EGMP = Ethylene glycol methacrylate phosphate.
AMPS = Acrylamido-methyl-propane-sulphonic acid.
Methoxy PEGM 5000 = Methoxy polyethylene glycol methacrylate with molecular weight 5000.

TABLE 1c

|  | TEST N° | CONSTITUENT MONOMERS | SPECIFIC VISCOSITY | INITIAL 10 rev/min | INITIAL 100 rev/min | 8 days BEFORE STIRRING 10 rev/min | 8 days BEFORE STIRRING 100 rev/min | 8 days AFTER STIRRING 10 rev/min | 8 days AFTER STIRRING 100 rev/min | ZETA POTENTIAL (mV) |
|---|---|---|---|---|---|---|---|---|---|---|
| Invention | 13 | 3.3% MMA<br>13.0% AA<br>5.0% ITCA<br>78.7% methoxy PEGM 2000 | 1.47 | 1100 | 330 | 6000 | 1000 | 1900 | 570 | −10.9 |
| Invention | 14 | 0.8% MMA<br>79.3% AA<br>19.9% methoxy PEGM 2000 | 1.38 | 7000 | 1000 | 8000 | 1100 | 6000 | 810 | −27.5 |
| Invention | 15 | 0.4% MMA<br>79.6% AA<br>20.0% methoxy PEGM 5000 | 1.38 | 6800 | 900 | 8000 | 1080 | 5600 | 800 | −24.5 |
| Invention | 16 | 35.0% AA<br>20.0% methoxy PEG MU 750<br>45.0% Acrylamide | 1.28 | 7400 | 1020 | 9100 | 1340 | 7240 | 1040 | −29.8 |
| Invention | 17 | 35.0% AA<br>20.0% methoxy PEGM 2000<br>45.0% Acrylamide | 1.03 | 8000 | 1060 | 11800 | 1630 | 7500 | 1080 | −25.7 |
| Invention | 18 | 15.0% MMA<br>12.0% AA<br>73.0% methoxy PEGM 350 | 1.65 | 2200 | 650 | 7000 | 1150 | 1600 | 380 | −29.8 |

AA = Acrylic acid.
MAA = Methacrylic acid.
Methoxy PEG MU 750 = Methoxy polyethylene glycol methacrylurethane with molecular weight 750.
Methoxy PEGM 2000 = Methoxy polyethylene glycol methacrylurethane with molecular weight 2000.
Methoxy PEGM 350 = Methoxy polyethylene glycol methacrylate with molecular weight 350.
ITCA = Itaconic acid.
AMPS = Acrylamido-methyl-propane-sulphonic acid.
Methoxy PEGM 5000 = Methoxy polyethylene glycol methacrylate with molecular weight 5000.

TABLE 1d

| | TEST N° | CONSTITUENT MONOMERS | SPECIFIC VISCOSITY | BROOKFIELD™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 19 | 3.4% MMA<br>13.5% AA<br>82.1% methoxy PEGM 2000<br>1.0% EDMA | 1.38 | 3400 | 650 | 12000 | 2000 | 2100 | 520 | −12.5 |
| Invention | 20 | 3.9% MMA<br>1.1% AA<br>95.0% methoxy PEGM 2000 | 1.16 | 9000 | 3600 | 11000 | 4250 | 5150 | 2000 | −12.5 |
| Invention | 21 | 0.8% MMA<br>79.2% AA<br>20.0% methoxy PEGM 2000 | 1.07 | 9400 | 1080 | 9000 | 1250 | 8050 | 1150 | −20.3 |
| Invention | 22 | 1.7% MMA<br>13.2% AA<br>85.6% propoxy PEGM 2800 | 1.28 | 11200 | 1440 | 12000 | 2100 | 9000 | 1200 | −16.5 |
| Invention | 22 bis | 45% AA<br>35% AMPS<br>20% methoxy PEGM 750 | 0.68 | 3450 | 685 | 3880 | 1156 | 3100 | 653 | −28 |

AA = Acrylic acid.
MAA = Methacrylic acid.
Methoxy PEGM 2000 = Methoxy polyethylene glycol methacrylate with molecular weight 2000.
Propoxy PEGM 2800 = Propoxy polyethylene glycol methacrylate with molecular weight 2800.
Methoxy PEGM 750 = Methoxy polyethylene glycol methacrylate with molecular weight 750
AMPS = Acrylamido-methyl-propane-sulphonic acid A reading of Tables 1a to 1d shows that the use of copolymer according to the invention containing, as a non-ionic monomer, at least one monomer of formula (I) results in the obtaining of aqueous suspensions of mineral pigments and/or fillers, according to the invention, with a moderate to high mineral material content, stable over time and having a low Zeta potential.

EXAMPLE 2

The purpose of this example is to illustrate different levels of use of dispersing agent according to the invention.

To this end, with the same operating method and the same equipment as in example 1, different levels of copolymer according to the invention are tested.

Test N° 23:

This test, illustrating the invention, used 0.4% by dry weight of a polymer fully neutralised with soda, with a specific viscosity of 0.98 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

Test N° 24:

This test, illustrating the invention, used 0.6% by dry weight of a polymer fully neutralised with soda, with a specific viscosity of 1.17 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=11.

Test N° 25:

This test, illustrating the invention, used 1.0% by dry weight of a polymer fully neutralised with soda, with a specific viscosity of 0.86 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=17.

All the experimental results are set out in Table 2 below.

TABLE 2

| | TEST N° | CONSTITUENT MONOMERS | QUANTITY OF AGENT (% dry/dry) | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 23 | 3.5% MMA<br>13.5% AA<br>83.0% methoxy PEGM 2000 | 0.4 | 2000 | 480 | 1800 | 660 | 1890 | 540 | −20.8 |
| Invention | 24 | 3.5% MMA<br>13.5% AA<br>83.0% methoxy PEGM 500 | 0.6 | 2600 | 540 | 3000 | 750 | 2500 | 510 | −24.2 |
| Invention | 25 | 3.5% MMA<br>13.5% AA<br>83.0% methoxy PEGM 750 | 1.0 | 8000 | 1300 | 9000 | 1600 | 8500 | 1500 | −25.9 |

AA = Acrylic acid.
MAA = Methacrylic acid.
Methoxy PEGM 750 = Methoxy polyethylene glycol methacrylate with molecular weight 750.
Methoxy PEGM 2000 = Methoxy polyethylene glycol methacrylate with molecular weight 2000.
Methoxy PEGM 500 = Methoxy polyethylene glycol methacrylate with molecular weight 500.

A reading of Table 2 shows that the aqueous suspensions of mineral pigments and/or fillers, according to the invention, with a moderate to high mineral material content, stable over time and having a low Zeta potential, contain 0.05% to 5% by dry weight of the agent according to the invention compared with the total dry weight of the fillers and/or pigments, and even more particularly 0.3% to 1.0% by dry weight of the said agent with respect to the total dry weight of the fillers and/or pigments.

EXAMPLE 3

The purpose of this example is to illustrate the different values of the product (m+n+p)q of the monomer with an unsaturated ethylenic non-ionic chain of formula (I) of the dispersing agent according to the invention.

For this purpose, with the same operating mode and the same equipment as in example 1, different copolymers according to the invention are tested.

Test N° 26:

This test, illustrating the invention, used 0.4% by dry weight of a polymer fully neutralised with soda, with a specific viscosity of 1.19 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=17.

Test N° 27:

This test, illustrating the invention, used 0.8% by dry weight of a polymer fully neutralised with soda, with a specific viscosity of 0.81 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=25.

Test N° 28:

This test, illustrating the invention, used 0.4% by dry weight of a polymer fully neutralised with soda, with a specific viscosity of 1.05 and consisting of:

a) 3.5% by weight methacrylic acid and 13.5% by weight acrylic acid as anionic monomers with a monocarboxylic function b) 83.0% by weight of a monomer of formula (T) in which $R_1$ represents hydrogen $R_2$ represents hydrogen R represents the methacrylate group R' represents the methyl radical with (m+n+p)q=45.

Test N° 29:

This test, illustrating the invention, used 0.4% by dry weight of a polymer fully neutralised with soda, with a specific viscosity of 2.57 and consisting of:

a) 3.5% by weight methacrylic acid and 13.5% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=113.

All the experimental results are set out in Table 3 below.

TABLE 3

| | TEST N° | CONSTITUENT MONOMERS | (m + n + p)q | BROOKFIELD™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 26 | 3.5% MMA<br>13.5% AA<br>83.0% methoxy PEGM 750 | 17 | 4000 | 820 | 3200 | 980 | 4500 | 930 | −23.9 |
| Invention | 27 | 3.5% MMA<br>13.5% AA<br>83.0% methoxy PEGM 1100 | 25 | 3200 | 810 | 4000 | 1000 | 3500 | 940 | −22.1 |
| Invention | 28 | 3.5% MMA<br>13.5% AA<br>83.0% methoxy PEGM 2000 | 45 | 2000 | 470 | 3000 | 850 | 2230 | 590 | −18.6 |
| Invention | 29 | 3.5% MMA<br>13.5% AA<br>83.0% methoxy PEGM 5000 | 113 | 4600 | 820 | 9000 | 1600 | 5000 | 1200 | −6.7 |

AA = Acrylic acid.
MAA = Methacrylic acid.
Methoxy PEGM 750 = Methoxy polyethyleneglycolmethacrylate with molecular weight 750.
Methoxy PEGM 2000 = Methoxy polyethyleneglycolmethacrylate with molecular weight 2000.
Methoxy PEGM 1100 = Methoxy polyethyleneglycolmethacrylate with molecular weight 1100.
Methoxy PEGM 5000 = Methoxy polyethyleneglycolmethacrylate with molecular weight 5000.

A reading of Table 3 shows that the use of a copolymer according to the invention containing, as a non-ionic monomer, at least one monomer of formula (I) with $5 \leq (m+n+p)q \leq 150$ results in the obtaining of aqueous suspensions of mineral pigments and/or fillers, according to the invention, with a moderate to high mineral material content, stable over time and having a low Zeta potential.

EXAMPLE 4

The purpose of this example is to illustrate different molecular weights of the dispersing agent according to the invention.

For this purpose, with the same operating mode and the same equipment as in example 1, tests were carried out on different copolymers which all had a different specific viscosity for the same composition by weight of monomer and the same form of neutralisation.

For tests 30 to 35, these were copolymers fully neutralised with soda and consisting of a) 3.2% by weight methacrylic acid as an anionic monomer with a monocarboxylic function b) 13.5% by weight ethylene glycol methacrylate phosphate as an anionic monomer with a phosphoric function c) 83.3% by weight of a monomer of formula (I) in which:
$R_1$ represents hydrogen
$R_2$ represents hydrogen
R represents the methacrylate group
R' represents the methyl radical
with (m+n+p)q=45.
and having the following specific viscosities:

Test N° 30:
The polymer used in this test, at 0.6% by dry weight with respect to the dry weight of marble, has a specific viscosity of 0.97 and illustrates the invention.

Test N° 31:
The polymer used in this test, at 0.6% by dry weight with respect to the dry weight of marble, has a specific viscosity of 1.57 and illustrates the invention.

Test N° 32:
The polymer used in this test, at 1.0% by dry weight with respect to the dry weight of marble, has a specific viscosity of 1.75 and illustrates the invention.

Test N° 33:
The polymer used in this test, at 0.8% by dry weight with respect to the dry weight of marble, has a specific viscosity of 3.72 and illustrates the invention.

Test N° 34:
The polymer used in this test, at 1.0% by dry weight with respect to the dry weight of marble, has a specific viscosity of 3.74 and illustrates the invention.

Test N° 35:
The polymer used in this test, at 1.0% by dry weight with respect to the dry weight of marble, has a specific viscosity of 5.08 and illustrates the invention.

For tests 36 to 39, these are copolymers fully neutralised with soda and consisting of a) 8.0% by weight acrylic acid as an anionic monomer with a monocarboxylic function b) 5.5% by weight ethylene glycol methacrylate phosphate as an anionic monomer with a phosphoric function c) 82.0% by weight of a monomer of formula (I) in which:
$R_1$ represents hydrogen
$R_2$ represents hydrogen
R represents the methacrylurethane group
R' represents the methyl radical
d) 4.5% by weight ethyl acrylate
with (m+n+p)q=113.
and having the following specific viscosities:

Test N° 36:
The polymer used in this test, at 0.8% by dry weight with respect to the dry weight of marble, has a specific viscosity of 1.19 and illustrates the invention.

Test N° 37:
The polymer used in this test, at 0.8% by dry weight with respect to the dry weight of marble, has a specific viscosity of 1.31 and illustrates the invention.

Test N° 38:
The polymer used in this test, at 0.8% by dry weight with respect to the dry weight of marble, has a specific viscosity of 1.83 and illustrates the invention.

Test N° 39:

The polymer used in this test, at 0.8% by dry weight with respect to the dry weight of marble, has a specific viscosity of 2.04 and illustrates the invention.

For tests 40 and 41, these are copolymers fully neutralised with soda and consisting of a) 3.5% by weight methacrylic acid and 13.5% by weight acrylic acid as anionic monomers with a monocarboxylic function b) 83.0% by weight of a monomer of formula (I) in which:
$R_1$ represents hydrogen
$R_2$ represents hydrogen
R represents the methacrylate group
R' represents the methyl radical with $(m+n+p)_q$ 45.

and having the following specific viscosities:

Test N° 40:

The polymer used in this test, at 0.4% by dry weight with respect to the dry weight of marble, has a specific viscosity of 0.98 and illustrates the invention.

Test N° 41:

The polymer used in this test, at 0.4% by dry weight with respect to the dry weight of marble, has a specific viscosity of 2.33 and illustrates the invention.

All the Brookfield™ viscosity and Zeta potential experimental results measured with the same equipment and under the same operating conditions as in Example 1 are set out in Tables 4a and 4b below.

TABLE 4a

| | TEST N° | CONSTITUENT MONOMERS | SPECIFIC VISCOSITY | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 30 | 3.2% MMA 13.5% EGMP 83.3% methoxy PEGM 2000 | 0.97 | 750 | 330 | 3000 | 500 | 700 | 240 | −12.6 |
| Invention | 31 | 3.2% MMA 13.5% EGMP 83.3% methoxy PEGM 2000 | 1.57 | 7400 | 920 | 13000 | 1300 | 8400 | 1120 | −15.7 |
| Invention | 32 | 3.2% MMA 13.5% EGMP 83.3% methoxy PEGM 2000 | 1.75 | 19000 | 2900 | 22000 | 3200 | 20000 | 3000 | −16.8 |
| Invention | 33 | 3.2% MMA 13.5% EGMP 83.3% methoxy PEGM 2000 | 3.72 | 20000 | 2800 | 25000 | 3000 | 22000 | 2900 | −16 |
| Invention | 34 | 3.2% MMA 13.5% EGMP 83.3% methoxy PEGM 2000 | 3.74 | 9000 | 1450 | 13000 | 1950 | 10000 | 1550 | −15.7 |
| Invention | 35 | 3.2% MMA 13.5% EGMP 83.3% methoxy PEGM 2000 | 5.08 | 13000 | 2600 | 15000 | 2750 | 14000 | 2700 | −18.6 |

AA = Acrylic acid.
MAA = Methacrylic acid.
Methoxy PEGM 2000 = Methoxy polyethylene glycol with molecular weight 2000.
EGMP = Ethylene glycol methacrylate phosphate.
EA = Ethyl acrylate.

TABLE 4b

| | TEST N° | CONSTITUENT MONOMERS | SPECIFIC VISCOSITY | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 36 | 8.0% AA 5.5% EGMP 82.0% methoxy PEG MU 5000 4.5% EA | 1.19 | 2200 | 780 | 5000 | 1700 | 3200 | 1140 | −6.2 |
| Invention | 37 | 8.0% AA 5.5% EGMP 82.0% methoxy PEG MU 5000 4.5% EA | 1.31 | 950 | 430 | 4500 | 700 | 700 | 390 | −5.7 |
| Invention | 38 | 8.0% AA 5.5% EGMP 82.0% methoxy PEG MU 5000 4.5% EA | 1.83 | 6400 | 970 | 7000 | 1100 | 1900 | 600 | −8.6 |

TABLE 4b-continued

| | TEST N° | CONSTITUENT MONOMERS | SPECIFIC VISCOSITY | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 39 | 8.0% AA<br>5.5% EGMP<br>82.0% methoxy PEG MU 5000<br>4.5% EA | 2.04 | 6800 | 1280 | 9000 | 1350 | 2200 | 920 | −5.6 |
| Invention | 40 | 3.5% MMA<br>13.5% AA<br>83.0% methoxy PEGM 2000 | 0.98 | 2000 | 480 | 1800 | 660 | 1890 | 540 | −20.8 |
| Invention | 41 | 3.5% MMA<br>13.5% AA<br>83.0% methoxy PEGM 2000 | 2.33 | 6400 | 920 | 5000 | 1010 | 6900 | 1400 | −15.2 |

AA = Acrylic acid.
MAA = Methacrylic acid.
Methoxy PEGM 2000 = Methoxy polyethylene glycol with molecular weight 2000.
EGMP = Ethylene glycol methacrylate phosphate.
Methoxy PEG MU 5000 = Methoxy polyethylene glycol methacrylurethane with molecular weight 5000.
EA = Ethyl acrylate.

A reading of Tables 4a and 4b shows that the use of a copolymer according to the invention having a specific viscosity of no more than 10, preferentially no more than 5 and highly preferentially no more than 2, results in the obtaining of aqueous suspensions of mineral pigments and/or fillers, according to the invention, with a high mineral material content, stable over time and having a low Zeta potential.

EXAMPLE 5

The purpose of this example is to illustrate different types and degrees of neutralisation of the dispersing agent according to the invention.

For this purpose, with the same operating mode and the same equipment as in example 1, tests were carried out, at 0.4% by dry weight with respect to the dry weight of marble, on the following different copolymers, which had different neutralisations for the same composition by weight of monomer and the same specific viscosity.

These were all copolymers with a specific viscosity of 1.05 and consisting of:

a) 3.5% by weight methacrylic acid and 13.5% by weight acrylic acid as anionic monomers with a monocarboxylic function b) 83.0% by weight of a monomer of formula (I) in which:
$R_1$ represents hydrogen
$R_2$ represents hydrogen
R represents the methacrylate group
R' represents the methyl radical
with (m+n+p)q=45.

The different types and degrees of neutralisation are as follows:

Test N° 42:
The polymer used in this test is fully neutralised with potash and illustrates the invention.

Test N° 43:
The polymer used in this test is fully neutralised with ammonium hydroxide and illustrates the invention.

Test N° 44:
The polymer used in this test is totally acidic and illustrates the invention.

Test N° 45:
The polymer used in this test is fully neutralised with triethanolamine and illustrates the invention.

Test N° 46:
The polymer used in this test is fully neutralised with lithium hydroxide and illustrates the invention.

Test N° 47:
The polymer used in this test is neutralised to the extent of 50% molar with magnesium hydroxide and illustrates the invention.

Test N° 48:
The polymer used in this test is fully neutralised with a mixture composed of 70% molar soda and 30% molar lime and illustrates the invention.

Test No 49:
The polymer used in this test is fully neutralised with a mixture composed of 50% molar soda and 50% molar magnesium hydroxide and illustrates the invention.

All the Brookfield™ viscosity and Zeta potential experimental results measured with the same equipment and under the same operating conditions as in Example 1 are set out in Tables 5a and 5b below.

TABLE 5a

| | TEST N° | CONSTITUENT MONOMERS | NEUTRALI-SATION | BROOKFIELD ™ VISCOSITY (mPa · s) | | | | | | ZETA POTENTIAL (mV) |
| --- | --- | --- | --- | --- | --- | --- | --- | --- | --- | --- |
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 42 | 3.5% MMA 13.5% AA 83.0% methoxy PEGM 2000 | 100 K | 1100 | 255 | 3000 | 700 | 1200 | 290 | −19.5 |
| Invention | 43 | 3.5% MMA 13.5% AA 83.0% methoxy PEGM 2000 | 100 NH$_4$OH | 6000 | 840 | 6000 | 1100 | 4500 | 790 | −14.7 |
| Invention | 44 | 3.5% MMA 13.5% AA 83.0% methoxy PEGM 2000 | 0 | 2200 | 490 | 5000 | 1000 | 2500 | 290 | −10.1 |
| Invention | 45 | 3.5% MMA 13.5% AA 83.0% methoxy PEGM 2000 | 100 TEA | 4500 | 700 | 4000 | 900 | 2900 | 550 | −14.8 |
| Invention | 46 | 3.5% MMA 13.5% AA 83.0% methoxy PEGM 2000 | 100 Li | 4100 | 670 | 8000 | 1050 | 7000 | 950 | −20.3 |
| Invention | 47 | 3.5% MMA 13.5% AA 83.0% methoxy PEGM 2000 | 50 Mg | 1500 | 360 | 3500 | 650 | 1700 | 325 | −8.8 |

AA = Acrylic acid.
MAA = Methacrylic acid.
Methoxy PEGM 2000 = Methoxy polyethylene glycol with molecular weight 2000.

TABLE 5b

| | TEST N° | CONSTITUENT MONOMERS | NEUTRALI-SATION | BROOKFIELD ™ VISCOSITY (mPa · s) | | | | | | ZETA POTENTIAL (mV) |
| --- | --- | --- | --- | --- | --- | --- | --- | --- | --- | --- |
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 48 | 3.5% MMA 13.5% AA 83.0% methoxy PEGM 2000 | 70 Na–30 Ca | 4000 | 620 | 5000 | 1000 | 4000 | 720 | −18.9 |
| Invention | 49 | 3.5% MMA 13.5% AA 83.0% methoxy PEGM 2000 | 50 Na–50 Mg | 4600 | 800 | 7000 | 1100 | 5200 | 850 | −15.5 |

AA = Acrylic acid.
MAA = Methacrylic acid.
Methoxy PEGM 2000 = Methoxy polyethylene glycol with molecular weight 2000.

A reading of Tables 5a and 5b shows that the use of a copolymer according to the invention, totally acid or partially or totally neutralised with one or more neutralisation agents having a monovalent neutralising function or a polyvalent neutralising function results in the obtaining of aqueous suspensions of mineral pigments and/or fillers, according to the invention, with a high mineral matter content, stable over time and having a low Zeta potential.

EXAMPLE 6

This example relates to the grinding of a suspension of natural calcium carbonate in order to refine into a microparticular suspension.

For this purpose, for each test, 0.75% by dry weight, with respect to the total dry weight of the calcium carbonate, of grinding aid agent to be tested, was introduced into an aqueous suspension of 42% dry matter of a marble coming from the Carrara deposits and with a mean diameter of around 10 μm.

The suspension circulated in a grinder of the Dyno-Mill type with a fixed cylinder and rotating impeller, whose grinding substance consisted of corundum balls with a diameter in the range from 0.6 millimetres to 1 millimetre.

The total volume occupied by the grinding substance was 1150 cubic centimetres whilst its weight was 2900 g.

The grinding chamber had a volume of 1400 cubic centimetres.

The circumferential speed of the grinder was 10 metres per second.

The suspension of calcium carbonate was recycled at the rate of 18 litres per hour.

The outlet of the Dyno-Mill was provided with a separator with 200 micron mesh for separating the suspension resulting from the grinding and the grinding substance.

The temperature during each grinding test was kept at approximately 60° C.

At the end of the grinding ($T_0$), a sample of the pigmentary solution was recovered in a flask. The granulometry of the suspension (% of particles less than 1 micrometre) was measured by means of a Sedigraph™ 5100 granulometer from Micromeritics.

The Brookfield™ viscosity of the suspension was measured by means of a Brookfield™ type RVT viscometer, at a temperature of 20° C. and speeds of rotation of 10 revolutions per minute and 100 revolutions per minute with the appropriate spindle.

After leaving at rest for 8 days in the flask, the Brookfield™ viscosity of the suspension was measured by introducing, into the unstirred flask, the appropriate spindle of the Brookfield™ type RVT viscometer, at a temperature of 20° C. and speeds of rotation of 10 revolutions per minute and 100 revolutions per minute (viscosity BS=before stirring).

The same Brookfield™ viscosity measurements were also carried out once the flask was stirred and constituted the AS (after stirring) viscosity results.

Thus, in the different tests the following different grinding aid agents were tested.

Test N° 50:

This test, illustrating the invention, uses a polymer 100% neutralised with soda, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which
$R_1$ represents hydrogen
$R_2$ represents hydrogen
R represents the methacrylate group
R' represents the methyl radical
with (m+n+p)q=45.

Test N° 51:

This test, illustrating the invention, uses a polymer fully neutralised with potash, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which
$R_1$ represents hydrogen
$R_2$ represents hydrogen
R represents the methacrylate group
R' represents the methyl radical
with (m+n+p)q=45.

Test N° 52:

This test, illustrating the invention, uses a polymer, with a specific viscosity of 0.98, fully neutralised so that 50% of the acid groups are neutralised with soda and 50% of the acid groups are neutralised with magnesium hydroxide, and consisting of:

a) 3.4% by weight methacrylic acid and 13.6% by weight acrylic acid as anionic monomers with a monocarboxylic function b) 83.0% by weight of a monomer of formula (I) in which
$R_1$ represents hydrogen
$R_2$ represents hydrogen
R represents the methacrylate group
R' represents the methyl radical
with (m+n+p)q=45.

Test N° 53:

This test, illustrating the invention, uses a non-neutralised polymer, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which
$R_1$ represents hydrogen
$R_2$ represents hydrogen
R represents the methacrylate group
R' represents the methyl radical
with (m+n+p)q=45.

All the Brookfield™ viscosity and Zeta potential experimental results measured with the same equipment and under the same operating conditions as in Example 1 are set out in Table 6 below.

TABLE 6

| | TEST N° | CONSTITUENT MONOMERS | DEGREE OF NEUTRALISATION/ION | GRANU-LOMETRY (% <1 μm) | BROOKFIELD ™ VISCOSITY (mPa · s) | | | | | | ZETA POTENTIAL (mV) |
|---|---|---|---|---|---|---|---|---|---|---|---|
| | | | | | INITIAL | | 8 days BEFORE STIRRING | | 8 days AFTER STIRRING | | |
| | | | | | 10 rev/min | 100 rev/min | 10 rev/min | 100 rev/min | 10 rev/min | 100 rev/min | |
| Invention | 50 | 3.4% MMA 13.6% AA 83.0% methoxy PEGM 2000 | 100 Na | 70.4 | 2400 | 370 | 1700 | 455 | 750 | 170 | −15.7 |
| Invention | 51 | 3.4% MMA 13.6% AA 83.0% methoxy PEGM 2000 | 100 K | 73.9 | 2550 | 430 | 1500 | 535 | 950 | 230 | −13.4 |
| Invention | 52 | 3.4% MMA 13.6% AA 83.0% methoxy PEGM 2000 | 50 Na–50 Mg | 72.3 | 1300 | 300 | 650 | 120 | 650 | 112 | −11.9 |
| Invention | 53 | 3.4% MMA 13.6% AA 83.0% methoxy PEGM 2000 | 0 | 70.7 | 2850 | 460 | 1350 | 315 | 500 | 93 | −8.7 |

AA = Acrylic acid.
MAA = Methacrylic acid.
Methoxy PEGM 2000 = Methoxy polyethylene glycol with molecular weight 2000.

A reading of Table 6 shows that the use of a copolymer according to the invention, totally acidic or partially or totally neutralised with one or more neutralisation agents having a monovalent neutralisation function or a polyvalent neutralisation function results in the obtaining of aqueous solutions of ground mineral pigments and/or fillers, according to the invention, with a moderate to high mineral material content, stable over time and having a low Zeta potential.

EXAMPLE 7

This example relates to the grinding of a suspension of dolomite in order to refine it into a microparticular suspension.

For this purpose, for each test, a grinding aid agent to be tested was introduced, to the extent of 0.5% by dry weight, with respect to the total dry weight of dolomite, into an aqueous suspension with 65% dry matter of a dolomite whose 4.2% are not passing through a 100 µm sieve and whose median diameter measured by means of a CILAS type 850 granulometer was 15.03 micrometres.

The suspension circulated in a grinder of the Dyno-Mill type with fixed cylinder and rotating impeller, whose grinding substance consisted of balls of corundum with a diameter in the range 0.6 millimetres to 1 millimetre.

The total volume occupied by the grinding substance was 1150 cubic centimetres whilst its weight was 2900 g.

The grinding chamber had a volume of 1400 cubic centimetres.

The circumferential speed of the grinder was 10 metres per second.

The suspension of dolomite was recycled at 18 litres per hour.

The outlet from the Dyno-Mill was provided with a separator with meshes of 200 microns for separating the suspension resulting from the grinding, and the grinding substance.

The temperature during each grinding test was maintained at approximately 60° C.

At the end of grinding ($T_0$), a sample of the pigmentary suspension was recovered in a flask. The granulometry of the suspension (% of particles less than 2 micrometres) was measured by means of a CILAS type 850 granulometer.

The Brookfield™ viscosity of the suspension was measured by means of a Brookfield™ type RVT viscometer, at a temperature of 20° C. and speeds of rotation of 10 revolutions per minute and 100 revolutions per minute with the appropriate spindle.

After a residence time of 8 days in the flask, the Brookfield™ viscosity of the suspension was measured by introducing, into the unstirred flask, the appropriate spindle of the Brookfield™ type RVT viscometer, at a temperature of 20° C. and speeds of rotation of 10 revolutions per minute and 100 revolutions per minute (viscosity BS=before stirring).

The same Brookfield™ viscosity measurements were also made once the flask had been stirred and constitute the AS (after stirring) viscosity results.

Thus, in the different tests, the following different grinding aid agents were tested.

Test N° 54:

This test, illustrating the invention, uses a non-neutralised polymer, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

Test N° 55:

This test, illustrating the invention, uses a polymer fully neutralised with soda, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

Test N° 56:

This test, illustrating the invention, uses a polymer fully neutralised with potash, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

All the Brookfield™ viscosity and Zeta potential experimental results measured with the same equipment and under the same operating conditions as in Example 1 are set out in Table 7 below.

TABLE 7

| | TEST N° | CONSTITUENT MONOMERS | DEGREE OF NEUTRALISATION/ION | GRANULOMETRY (% <2 μm) | BROOKFIELD™ VISCOSITY (mPa·s) | | | | | | ZETA POTENTIAL (mV) |
|---|---|---|---|---|---|---|---|---|---|---|---|
| | | | | | INITIAL | | 8 days BEFORE STIRRING | | 8 days AFTER STIRRING | | |
| | | | | | 10 rev/min | 100 rev/min | 10 rev/min | 100 rev/min | 10 rev/min | 100 rev/min | |
| Invention | 54 | 3.4% MMA 13.6% AA 83.0% methoxy PEGM 2000 | 0 | 50.4 | 1070 | 183 | 1940 | 274 | 1330 | 205 | −5.7 |
| Invention | 55 | 3.4% MMA 13.6% AA 83.0% methoxy PEGM 2000 | 100 Na | 56.6 | 2070 | 266 | 2300 | 305 | 1910 | 261 | −7.0 |
| Invention | 56 | 3.4% MMA 13.6% AA 83.0% methoxy PEGM 2000 | 100 K | 52.1 | 2570 | 341 | 3470 | 436 | 3460 | 439 | −8.2 |

MAA = Methacrylic acid.
AA = Acrylic acid.
Methoxy PEGM 2000 = Methoxy polyethylene glycol with molecular weight 2000.

A reading of Table 7 shows that the use of a copolymer according to the invention results in the obtaining of aqueous suspensions of ground dolomites, according to the invention, with a moderate to high mineral material content, stable over time and having a low Zeta potential.

EXAMPLE 8

This example relates to the grinding of a suspension of natural calcium carbonate in order to refine it into a microparticular suspension in an industrial microelement grinder, followed by a reconcentration and a dispersal of the concentrated suspension by means of the dispersing agent according to the invention.

For this purpose, for each test according to the invention (Tests 57 and 58), after a grinding of an aqueous suspension with 41% dry matter of a Norwegian marble, using 0.6% by dry weight, with respect to the total dry weight of the calcium carbonate, of a grinding aid agent according to the invention, a polymer neutralised to the extent of 50% molar by potash, with a specific viscosity equal to 0.98 and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45, a thermal reconcentration of the refined suspension obtained was carried out until a slurry was obtained with a dry calcium carbonate concentration of 72%.

For Test N° 57 illustrating the invention, there was introduced into the thermal concentrator, during the reconcentration step, 0.75% by dry weight, with respect to the dry weight of calcium carbonate, of the copolymer fully neutralised with soda, with a specific viscosity of 0.98 and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

For Test N° 58 illustrating the invention, there was introduced into the thermal concentrator, during the reconcentration step, 0.75% by dry weight, with respect to the dry weight of calcium carbonate, of the copolymer with a specific viscosity of 0.98, fully neutralised with potash and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen $R_2$ represents hydrogen R represents the methacrylate group R' represents the methyl radical with (m+n+p)q=45.

All the Brookfield™ viscosity, Zeta potential and granulometry experimental results measured with the same equipment and under the same operating conditions as in Example 1 are set out in Table 8 below.

TABLE 8

| | TEST N° | DISPERSANT USED IN RECONCENTRATION | | GRANU-LOMETRY (% <1 μm) | BROOKFIELD ™ VISCOSITY (mPa · s) | | | | | | ZETA POTENTIAL (mV) |
|---|---|---|---|---|---|---|---|---|---|---|---|
| | | CONSTITUENT MONOMERS | DEGREE OF NEUTRALISA-TION/ION | | INITIAL | | 8 days BEFORE STIRRING | | 8 days AFTER STIRRING | | |
| | | | | | 10 rev/min | 100 rev/min | 10 rev/min | 100 rev/min | 10 rev/min | 100 rev/min | |
| Invention | 57 | 3.4% MMA 13.6% AA 83.0% methoxy PEGM 2000 | 100 Na | 76.6 | 2520 | 942 | 1100 | 900 | 1650 | 565 | −7.2 |
| Invention | 58 | 3.4% MMA 13.6% AA 83.0% methoxy PEGM 200 | 100 K | 75.7 | 1750 | 583 | 1200 | 690 | 1320 | 407 | −7.8 |

AA = Acrylic acid.
MAA = Methacrylic acid.
Methoxy PEGM 2000 = Methoxy polyethylene glycol with molecular weight 2000.

A reading of Table 8 shows that the use of a copolymer according to the invention results in the obtaining of aqueous suspensions of mineral pigments and/or fillers ground and then reconcentrated, according to the invention, with a moderate to high mineral material content, stable over time and having a low Zeta potential.

EXAMPLE 9

This example relates to the preparation of a suspension of different mineral fillers by simple dispersion and the revealing of the properties afforded by the presence of at least one monomer of formula (I) in the non-ionic monomer.

For this purpose, the aqueous suspension of mineral filler to be tested is prepared by the introduction first of all of the agent to be tested into the water and then of the mineral material to be dispersed.

Test N° 59:

This test illustrates the invention and uses kaolin (kaolin SPS from ECC) as a mineral material at a dry matter concentration of 60.5% and, as a dispersing agent, 1.0% by dry weight, with respect to the dry weight of kaolin, of a copolymer with a specific viscosity of 0.98, fully neutralised with potash and consisting of:

a) 3.4% by weight methacrylic acid and 13.6% by weight acrylic acid as anionic monomers with a monocarboxylic function b) 83.0% by weight of a monomer of formula (I) in which $R_1$ represents hydrogen
$R_2$ represents hydrogen
R represents the methacrylate group
R' represents the methyl radical with (m+n+p)q=45.

Test N° 60:

This test illustrates the invention and uses, as a mineral material, titanium dioxide sold by Tioxide under the name R-HD2 at a dry matter concentration of 60.4% and, as a dispersing agent, 0.4% in dry weight, with respect to the dry weight of titanium dioxide, of the same copolymer as the one used in Test N° 59.

Test N° 61:

This test illustrates the invention and uses, as a mineral material, lime supplied by Aldrich at a dry matter concentration of 60.6% and, as a dispersing agent, 1.0% by dry weight, with respect to the dry weight of lime, of the same copolymer as the one used in Test N° 59.

Test N° 62:

This test illustrates the invention and uses, as a mineral material, magnesium hydroxide supplied by Aldrich at a dry matter concentration of 60.5% and, as a dispersing agent, 0.4% by dry weight, with respect to the dry weight of magnesium hydroxide, of the same copolymer as the one used in Test N° 59.

Test N° 63:

This test illustrates the invention and uses, as a mineral material, a chalk sold by Omya under the name Etiquette Violette at a dry matter concentration of 70% and, as a dispersing agent, 0.3% by dry weight, with respect to the dry weight of chalk, of the same copolymer as the one used in Test N° 59.

All the Brookfield™ viscosity and Zeta potential experimental results measured with the same equipment and under the same operating conditions as in Example 1 are set out in Table 9 below.

TABLE 9

| | TEST N° | MINERAL FILLER | DRY MATTER % | BROOKFIELD ™ VISCOSITY (mPa · s) | | | | | | ZETA POTENTIAL (mV) |
|---|---|---|---|---|---|---|---|---|---|---|
| | | | | INITIAL | | 8 days BEFORE STIRRING | | 8 days AFTER STIRRING | | |
| | | | | 10 rev/min | 100 rev/min | 10 rev/min | 100 rev/min | 10 rev/min | 100 rev/min | |
| Invention | 59 | Kaolin | 60.5 | 3830 | 760 | 8000 | 1400 | 5200 | 950 | −10.6 |
| Invention | 60 | Titanium dioxide | 60.4 | 2600 | 480 | 3000 | 550 | 1100 | 170 | −17.2 |
| Invention | 61 | Chalk | 60.6 | 800 | 530 | 20000 | 4800 | 10000 | 4400 | −7.6 |

TABLE 9-continued

| | | | | BROOKFIELD ™ VISCOSITY (mPa · s) | | | | | | |
|---|---|---|---|---|---|---|---|---|---|---|
| | | | | INITIAL | | 8 days BEFORE STIRRING | | 8 days AFTER STIRRING | | ZETA |
| | TEST N° | MINERAL FILLER | DRY MATTER % | 10 rev/min | 100 rev/min | 10 rev/min | 100 rev/min | 10 rev/min | 100 rev/min | POTENTIAL (mV) |
| Invention | 62 | Magnesium hydroxide | 60.5 | 400 | 180 | 3000 | 3800 | 200 | 130 | −3.6 |
| Invention | 63 | Chalk | 70 | 790 | 146 | 3880 | 891 | 1740 | 277 | −28 |

A reading of Table 9 shows that the use of a copolymer according to the invention containing, as a non-ionic monomer, at least one monomer of formula (I) results in the obtaining of aqueous suspensions of mineral pigments and/or fillers, according to the invention, with a moderate to high mineral material content, stable over time and having a low Zeta potential, whatever the mineral material used.

EXAMPLE 10

The purpose of this example is to illustrate the low sensitivity of the aqueous suspensions according to the invention to alkaline pHs.

To do this, a quantity of polymer to be tested corresponding to 0.73% by dry weight with respect to the dry weight of mineral material was introduced into water.

After homogenisation of the polymer in the water by stirring, the pH of the medium was adjusted to 9 by adding soda.

The pH being constant, the necessary quantity of mineral material for obtaining a dry matter concentration of 70% was then introduced.

After 30 minutes stirring, ammonium hydroxide was added until a pH of 10 was obtained.

The sample was then divided into three parts.

The first part was reserved for a study of the Brookfield™ viscosity carried out with the same operating method and the same equipment as in the previous examples.

The second part of the sample was stirred for 30 minutes. After these 30 minutes of stirring, the pH was lowered to 7.5 by means of acetic acid.

At the end of 20 minutes additional stirring, a measurement of conductivity of the aqueous suspension of mineral material was carried out by means of a conductivity meter type LF 320 sold by Wissenschaftliche Technische Werkstätten. This value then corresponded to the conductivity of the suspension at a pH of 7.5. The sample was then subjected to a study of Brookfield™ viscosity as previously described.

The third part of the sample was stirred for 30 minutes. After these 30 minutes of stirring, the pH was raised to 13 by adding soda.

At the end of 20 minutes additional stirring, a measurement of conductivity of the aqueous suspension of mineral material was carried out using the same conductivity meter as the one used previously. This value then corresponded to the conductivity of the suspension at a pH of 13. The sample was then subjected to a study of Brookfield™ viscosity as previously described.

Test N° 64:

This test illustrates the prior art and uses, as a mineral material, a precipitated calcium carbonate sold by Solvay under the name Socal™ P3 and, as a dispersing agent, a polyacrylic acid with a specific viscosity of 0.84.

Test N° 65:

This test illustrates the invention and uses, as a mineral material, a precipitated calcium carbonate sold by Solvay under the name Socal™ P3 and, as a dispersing agent, the same copolymer as the one used in Test N° 59.

All the Brookfield™ viscosity and conductivity experimental results are set out in Table 10 below.

TABLE 10

| | | | | BROOKFIELD ™ VISCOSITY (mPa · s) | | | | | |
|---|---|---|---|---|---|---|---|---|---|
| | | | | INITIAL | | 8 days BEFORE STIRRING | | 8 days AFTER STIRRING | |
| | TEST N° | pH | CONDUCTIVITY mS/cm | 10 rev/min | 100 rev/min | 10 rev/min | 100 rev/min | 10 rev/min | 100 rev/min |
| Prior art | 64 | 7.5 | 2.27 | 10000 | 2764 | Viscosity too high | | not measurable | |
| | | 10 | 2.7 | 3460 | 926 | 3480 | 991 | 3390 | 858 |
| | | 13 | 11.2 | 50800 | 7440 | Viscosity too high | | not measurable | |
| Invention | 65 | 7.5 | 1.4 | 320 | 252 | 1020 | 442 | 430 | 300 |
| | | 10 | 1.7 | 400 | 362 | 820 | 531 | 450 | 366 |
| | | 13 | 4.8 | 8920 | 2500 | 10500 | 4230 | 8600 | 3204 |

A reading of Table 10 shows that the use of a copolymer according to the invention containing at least one monomer of formula (I) as a non-ionic monomer results in the obtaining of aqueous suspensions of mineral pigments and/or fillers, according to the invention, with a moderate or high mineral matter content, stable over time and having a low sensitivity to alkaline pHs.

EXAMPLE 11

The purpose of this example is to illustrate the low sensitivity of the aqueous suspensions according to the invention to acidic or weakly alkaline pHs.

To do this, a quantity of polymer to be tested corresponding to 0.45% by dry weight with respect to the dry weight of mineral material was introduced into water.

After homogenisation of the polymer in water by stirring, the necessary quantity of mineral material for obtaining a dry matter concentration of 60% was introduced.

After 30 minutes stirring, the sample was then divided into three parts for measurements of Brookfield™ viscosity and conductivity on each of the parts of the sample with the same operating method and the same equipment as used in the previous example.

The first part corresponded to a natural pH of a dispersion of 8 and was reserved for the study of Brookfield™ viscosity as described in Example 10.

For the second part of the sample, the pH was reduced to 6 by means of hydrochloric acid.

At the end of 20 minutes additional stirring, a measurement of conductivity of the aqueous suspension of the mineral matter was carried out. This value then corresponded to the conductivity of the suspension for a pH of 6.0. The sample was then subjected to a study of Brookfield™ viscosity as previously described.

For the third part of the sample, the pH was reduced to 3 by a further addition of hydrochloric acid.

At the end of 20 minutes additional stirring, a measurement of conductivity of the aqueous suspension of mineral matter was carried out using the same conductivity meter as the one used previously. This value then corresponded to the conductivity of the suspension at a pH of 3. This sample was then subjected to a study of Brookfield™ viscosity as previously described.

Test N° 66:

This test illustrates the prior art and uses, as a mineral material, a titanium dioxide sold by Tioxide under the name R-HD2 and, as a dispersing agent, a copolymer sold by Coatex under the name Coatex BR3, with a specific viscosity of 1.3.

In this test, it was impossible to continue the dispersion when the pH had dropped to 3 since the titanium oxide had caked and blocked the disperser.

The measurements of Brookfield™ viscosity and conductivity could therefore not be carried out at this pH value.

Test N° 67:

This test illustrates the invention and uses, as a mineral matter, a titanium dioxide sold by Tioxide under the name R-HD2 and, as a dispersing agent, the same copolymer as that used in Test N° 59.

All the Brookfield™ viscosity and conductivity experimental results are set out in Table 11 below.

TABLE 11

|  | TEST N° | pH | FINAL DRY EXTRACT (%) | CONDUCTIVITY Ms/cm | INITIAL | | 8 days BEFORE STIRRING | | 8 days AFTER STIRRING | |
|---|---|---|---|---|---|---|---|---|---|---|
|  |  |  |  |  | 10 rev/min | 100 rev/min | 10 rev/min | 100 rev/min | 10 rev/min | 100 rev/min |
| Prior art BR 3 | 66 | 3 | Dispersion impossible | Dispersion impossible | Dispersion impossible | Dispersion impossible | Dispersion impossible | Dispersion impossible | Dispersion impossible | Dispersion impossible |
|  |  | 6 | 59.5 | 2 | 24040 | 2592 | Viscosity too high | | not measurable | |
|  |  | 8 | 59.1 | 1.9 | 214 | 160 | 302 | 218 | 165 | 98 |
| Invention | 67 | 3 | 59.9 | 4.84 | 79 | 136 | 95 | 148 | 89 | 102 |
|  |  | 6 | 58.9 | 1.25 | 3120 | 374 | 3400 | 336 | 3240 | 436 |
|  |  | 8 | 59.3 | 0.88 | 760 | 138 | 860 | 138 | 660 | 104 |

A reading of Table 11 shows that the use of a copolymer according to the invention containing, as a non-ionic monomer, at least one monomer of formula (I) results in the obtaining of aqueous suspensions of mineral pigments and/or fillers, according to the invention, with a moderate to high mineral matter content, stable over time and having a low sensitivity to changes from the natural pH of the dispersion to acid to highly acid pHs.

EXAMPLE 12

The purpose of this example is to illustrate the low sensitivity to ionic strength of the aqueous suspensions according to the invention.

To do this, with the same operating method and with the same equipment as before, the mineral materials are put in suspension at a dry matter concentration of 72% in salt water with a sodium chloride content of 2 moles per litre of bipermuted water.

Test N° 68:

This test illustrates the prior art and uses, as a mineral material, a precipitated calcium carbonate sold by Solvay under the name Socal™ P3 and, as a dispersing agent, 0.73% by dry weight, with respect to the dry weight of precipitated calcium carbonate, a polyacrylic acid with a specific viscosity of 0.84.

It was impossible to put all the precipitated calcium carbonate in suspension, the spindle of the stirrer being locked before the end of the introduction of the total quantity of precipitated calcium carbonate.

Test N° 69:

This test illustrates the invention and uses, as a mineral material, a precipitated calcium carbonate (sold by Solvay under the name Socal™ P3) and, as a dispersing agent, 0.73% by dry weight, with respect to the dry weight of precipitated calcium carbonate, the same copolymer as the one used in Test N° 53.

It was possible to put all the precipitated calcium carbonate in suspension and the Brookfield™ viscosity and conductivity experimental results are set out in Table 12 below.

TABLE 12

| | TEST N° | pH | CONDUCTIVITY mS/cm | BROOKFIELD ™ VISCOSITY (mPa · s) | | | | | |
|---|---|---|---|---|---|---|---|---|---|
| | | | | INITIAL | | 8 days BEFORE STIRRING | | 8 days AFTER STIRRING | |
| | | | | 10 rev/min | 100 rev/min | 10 rev/min | 100 rev/min | 10 rev/min | 100 rev/min |
| Prior art | 68 | 9 | Impossible to put all the calcium carbonate in suspension | | | | | | |
| Invention | 69 | 9 | 43.8 | 590 | 446 | 1000 | 960 | 620 | 544 |

A reading of Table 12 shows that the use of a copolymer according to the invention containing, as a non-ionic monomer, at least one monomer of formula (I) results in the obtaining of aqueous suspensions of mineral pigments and/or fillers, according to the invention, with a moderate to high mineral matter content, stable over time and having a low sensitivity to the ionic strength of the medium, thus making it possible to obtain aqueous suspensions of mineral pigments and/or fillers which can be used in the field of drilling muds, in particular saturated salt muds and sea water muds.

EXAMPLE 13

This example relates to the use of the dispersing agent, copolymer according to the invention in the field of paint and more particularly water-based glazed paint. To do that, two tests are carried out.

Test n° 70, which illustrates the prior art, uses the dispersing agent COATEX BR 3

Test n° 71, which illustrates the invention, uses the 100% potash neutralised polymer of test n° 42.

For the test n° 70 illustrating the prior art, the constituents of the said water-based glazed paint were added in succession, these being:
40 g of monopropylene glycol
64 g of water
5 g of dispersing agent COATEX BR 3 at 40% solid content
2 g of a biocide, marketed by TROY under the name of MERGAL™ K6N
1 g of an anti-foaming agent marketed by HENKEL under the name of NOPCO™ NDW
150 g of a calcium carbonate marketed by OMYA under the name of OMYA DP 80 OG
200 g of titanium dioxide marketed by MILLENNIUM under the name RHD2
These constituents are stirred during 20 minutes, and then, the other constituents are added in succession, these being:
450 g of a styrene-acrylic binder in dispersion, marketed by RHODIA under the name of RHODOPAS™ DS 910
30 g of butyldiglycol
100 g of water
4 g of a thickening agent marketed by COATEX under the name COATEX BR100P
1 g of 28% ammonia and
3 g of NOPCO™ NDW After agitating the aqueous composition made up in this way for a few minutes at a pH equal to 8.7 and after observing a good slurrying, the Brookfield™ viscosities of the different compositions are measured at 25° C. and at 10 revolutions per minute and 100 revolutions per minute using a standard RVT Brookfield™ viscometer fitted with the requisite spindle. They are equal to 3400 mPa·s at 10 rpm and to 1900 mPa·s at 100 rpm.

The ICI viscosity, which is a high shear (10 000 s$^{-1}$) viscosity, is measured with the use of a plan cone viscometer.

We obtain a ICI viscosity of 1.5.

The Stormer (KU) viscosity is also measured in Krebs Unit with the use of a Stormer viscometer.

We obtain a Stormer viscosity of 94 KU.

Test N° 71:

For this test illustrating the invention, the constituents of the water-based glazed, paint are added in succession, these being:
40 g of monopropylene glycol
62.7 g of water
6.3 g of the polymer of the test n° 42 at a solid content of 31.6%
2 g of a biocide, marketed by TROY under the name of MERGAL™ K6N
1 g of an anti-foaming agent marketed by HENKEL under the name of NOPCO™ NDW
150 g of a calcium carbonate marketed by OMYA under the name of OMYA DP 80 OG
200 g of titanium dioxide marketed by MILLENNIUM under the name RHD2
These constituents are stirred during 20 minutes and then, the other constituents are added in succession, these being:
450 g of a styrene-acrylic binder in dispersion, marketed by RHODIA under the name of RHODOPAS™ DS 910
30 g of butyldiglycol
100 g of water
4 g of a thickening agent marketed by COATEX under the name COATEX BR1002
1 g of 28% ammonia and
3 g of NOPCO™ NDW After agitating the aqueous composition made up in this way for a few minutes at a pH equal to 8.7 and after observing a good slurrying, the Brookfield™ viscosities of the different compositions are measured at 25° C. and at 10 revolutions per minute and 100 revolutions per minute using a standard RVT Brookfield™ viscometer fitted with the requisite spindle. They are equal to 3000 mPa·s at 10 revolutions per minute and 1700 mPa·s at 100 revolutions per minute.

The ICI viscosity, which is a high shear (10 000 S$^{-1}$) viscosity, is measured with the use of a plan cone viscometer.

We obtain a ICI viscosity of 1.4.

The Stormer (KU) viscosity is also measured in Krebs Unit with the use of a Stormer viscometer.

We obtain a Stormer viscosity of 93 KU.

The comparison between the obtained values for the use of the copolymer according to the invention and the obtained values for the use of a polymer, usually used by the skilled man in the art, allows to note that the copolymer according to the invention can be used in the field of paints.

EXAMPLE 14

This example concerns the use of the dispersing agent, the copolymer according to the invention, in the field of plastics materials.

For this purpose, an aqueous suspension of calcium carbonate (marble) obtained after flocculation was filtered in order to end up with a marble filtration cake with a mean diameter of 2 micrometres measured by means of a Sedigraph™ 5100.

From this cake, the aqueous suspension of marble was prepared by introducing into the cake the required quantity by dry weight of the polymer agent of Test N° 4 according to the invention with respect to the dry weight of the said cake to be put in suspension in order to obtain an aqueous suspension of marble at a dry matter concentration of 68%.

Once this suspension had been produced, it was dried at a temperature of less than 105° C. by the use of a laboratory dryer of the Niro™ type.

The powder obtained without any agglomerate was then divided into two samples, one of which was to be the subject of the dispersion test in a thermoplastic resin and the other the subject of the dispersion test in a thermosetting resin.

Test N° 72:

This test, illustrating the invention, represents the test on the dispersion of the marble powder, previously obtained, in a thermoplastic resin.

For this purpose, 300 grams of previously prepared marble in powder form with a mean diameter of 2 $\mu$m was introduced into a Z-arm Guittard mixer with a capacity of 1.5 litres and having a vessel electrically heated to 240° C.

After 15 minutes of preliminary heating of the load at 240° C., 3 grams of commercial available zinc stearate and 125.5 grams of polypropylene homopolymer sold by the company Appryl under the name PPH 3120MN1 were introduced.

The whole was mixed for 20 minutes at this temperature and at a speed of 42 revolutions/minute.

With the mixture thus prepared, a calendering of part of this mixture was then carried out in the form of sheets which were cut into small cubes 2 to 3 millimetres square and whose MFI fluidity index was measured at 230° C. under a load of 2.16 kg and 10 kg with a 2.09 mm diameter die.

The MFI obtained was 8.0 g/10 min (230° C.-2.16 kg-2.09 mm) and 132 g/10 min (230° C.-10 kg-2.09 mm).

This MFI result shows that the use of the agent, the copolymer according to the invention, results in loaded thermoplastic compositions which can be used in the field of thermoplastics.

Test N° 73:

This test, illustrating the invention, represents the test for the dispersion of marble powder, previously obtained, in a thermosetting resin of the unsaturated polyester type.

For this purpose, in a 500 ml metallic box, 90 grams of unsaturated polyester resin reference Palapreg P18 from BASF, 60 grams of an additive called "Low Profile" and available under the reference LP40A from Union Carbide and 300 grams of the marble powder obtained were weighed.

After 24 hours of storing at rest, a presence of settling or sedimentation before homogenisation was noted.

Homogenisation of the mixture by stirring with a spatula was then carried out, and then the Brookfield™ viscosity at 100 revolutions/min was measured after this 24 hours by means of a Brookfield™ type RVT viscometer equipped with the module 7.

It was 32,000 mPa·s.

It should be noted that this premixing of the polyester and calcium carbonate can be used for manufacturing preimpregnates of the SMC (Sheet Moulding Compound) or BMC (Bulk Moulding Compound) type.

EXAMPLE 15

This example concerns the use of an aqueous suspension of mineral fillers according to the invention in the field of paper. It relates more specifically to the determination of the different Brookfield™ viscosity and water retention values of the different 100% calcium carbonate coating colors.

Test N° 74:

This test illustrates the prior art and uses a coating color composed of:

- 100 parts, expressed as dry matter, of an aqueous suspension according to the prior art, at 72% by dry weight of calcium carbonate having a particle such as 75% of the particles have a diameter less than 1 $\mu$m determined by Sedigraph™ 5100 and having 0–75% by dry weight of a dispersing agent marketed by Coatex under the name M 777,
- 12 parts, expressed as dry matter, of a styrene-butadiene latex sold by Dow under the name "DL 950",
- 0.5 parts, expressed as dry matter, of a water retention agent marketed by Coatex under the name Rheocoat™ 35.

The solid content of the coating color is about 65%.

Test N° 75:

This test illustrates the invention and uses a coating color composed of:

- 100 parts, expressed as dry matter, of an aqueous suspension according to the invention, at 72% by dry weight of calcium carbonate having a particle such as 75% of the particles have a diameter less than 1 $\mu$m determined by Sedigraph™ 5100 and having 0–75% by dry weight of a dispersing agent according to the invention and composed of 20% by weight of acrylic acid; 80% of methoxy PEG 2000 methacrylate having a specific viscosity of 1.26,
- 12 parts, expressed as dry matter, of a styrene-butadiene latex sold by Dow under the name "DL 950",
- 0.5 parts, expressed as dry matter, of a water retention agent marketed by Coatex under the name Rheocoat™ 35.

The solid content of the coating color is about 65%.

The results of the measurements of Brookfield™ viscosity determined at 10 and 100 revolutions per minute at 25° C. by means of a Brookfield™ viscometer type DV-1 equipped with the appropriate spindle are:

For test n° 74 according to the prior art: Brookfield™ viscosity at 10 rpm=8000 mPa·s Brookfield™ viscosity at 100 rpm=1500 mPa·s For test n° 75 according to the invention. Brookfield™ viscosity at 10 rpm=9200 mPa·s Brookfield™ viscosity at 100 rpm=1800 mPa·s The results of the water retention measurements obtained according to the following method is:

For test n° 74 according to the prior art, the water volume after 10 minutes is 3.2 ml, For test n° 75 according to the invention, the water volume after 10 minutes is 2.8 ml.

So, in order to measure the water retentions, the paper coating color to be tested is subjected to a pressure of 100 psi (7 bars) in a standard cylinder, equipped with a surface of the filter paper type capable of allowing water to pass.

After 10 minutes, the volume of water collected is measured in ml.

The lower the volume of water collected at the end of 10 minutes, the better is the retention.

To do this, use is made of an "API Fluid Loss Measurement" filter press from Baroid, which is composed essentially of a clamp provided with a clamping screw for locking the three parts of the filter body.

This body is composed of:

a base with a hole provided with a nozzle through which the filtrate flows. This base supports a metallic sieve with a mesh of 60 to 80, on which is placed the 90 mm diameter filter paper (Whatman™ N°50), the equivalent of which is the DURIEUX BLEU™ N° 3 type, a cylinder with an inside diameter of 76.2 mm and a height of 128 mm, a cover provided with a compressed gas inlet, whose seal with the cylinder is provided by means of a flat joint, of the same type as those placed on the base.

To use the filter press, the following are fitted in the following order:

the joint on the base the sieve on the joints the filter paper on the sieve the second joint on the filter paper and the cylinder is fitted on the base before locking the bayonet system.

Then it is filled with the coating color to be tested (approximately 480 g up to 3 cm from the top of the cylinder) before placing the cover on the cylinder, interposing a joint.

Then the assembly is placed in the clamp and is locked by means of the clamping screw, and then a graduated tube is arranged underneath the nozzle.

A pressure of 7 bars is applied, simultaneously triggering a chronometer.

After 20 minutes the volume of fluid collected in the test tube is noted. The accuracy of the result obtained is ±0.2 ml.

The reading of the previous results shows that the characteristics of the rheology and of the water-retention concerning the test according to the invention allow to use the aqueous suspensions according to the invention in the field of paper and more particularly in the coating of paper.

We claim:

1. A process comprising:

at least one of dispersing or grinding a mineral pigment, filler or combination thereof, in aqueous suspension in the presence of a water-soluble copolymer, wherein said water-soluble copolymer comprises polymerized units of a) at least one anionic monomer with an unsaturated ethylenic chain and a monocarboxylic function, b) optionally, at least one anionic monomer with an unsaturated ethylenic chain and a dicarboxylic, sulphonic, phosphoric, phosphonic function or a combination thereof, c) at least one non-ionic monomer having an unsaturated ethylenic chain of formula (I):

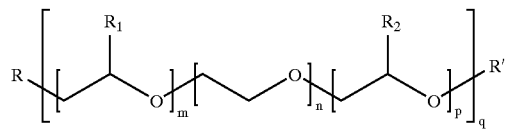

in which m and p represent a number of alkylene oxide units and are less than or equal to 150, n represents a number of ethylene oxide units and is less than or equal to 150, q represents a number at least equal to 1 and $$5 \leq (m+n+p)q \leq 150$$

$R_1$ is hydrogen, methyl or ethyl radical, $R_2$ is hydrogen, methyl or ethyl radical, R is selected from the group consisting of acrylurethane, methacrylurethane, α-α'-dimethylisopropenylbenzyl urethane and allyl urethane, R' represents a hydrocarbon radical having 1 to 5 carbon atoms, d) optionally, an acrylamide monomer, methacrylamide monomer, a derivative thereof or a mixture thereof, or one or more non water-soluble monomers, and e) optionally, at least one monomer having at least two unsaturated ethylenic chains selected from the group consisting of ethylene glycol dimethacrylate, trimethylolpropane-triacrylate, allyl acrylate, allyl maleate, methylenebisacrylamide, methylenebismethacrylamide, tetrallyloxyethane, a triallylcyanurate, and an allyl ether obtained from a polyol, wherein the total of a), b), c), d) and e) is 100%, and wherein the copolymer has a specific viscosity of no more than 10.

2. The process of claim 1, wherein the copolymer comprises at least one monomer a) selected from the group consisting of acrylic acid, methacrylic acid, a diacid hemiester and mixtures thereof.

3. The process of claim 1, wherein the copolymer comprises at least one monomer a) selected from the group consisting of a $C_1$ to $C_4$ monoester of maleic acid, a $C_1$ to $C_4$ monoester of itaconic acid and mixtures thereof.

4. The process of claim 1, wherein the copolymer comprises at least one anionic monomer b) selected from the group consisting of crotonic acid, isocrotonic acid, cinnamic acid, itaconic acid, maleic acid, citraconic acid, a carboxylic acid anhydride, maleic anhydride, acrylamido-methylpropanesulphonic acid, sodium methallyl sulphonate, vinyl sulfonic acid, styrene sulphonic acid, vinyl phosphoric acid, ethylene glycol methacrylic phosphate, propylene glycol methacrylic phosphate, ethylene glycol acrylate phosphate, propylene glycol acrylate phosphate, ethoxylates thereof, phosphonic vinyl acid and mixtures thereof.

5. The process of claim 1, wherein the copolymer comprises at least one monomer d) selected from the group consisting of an alkylacrylate, an alkyl methacrylate, a vinyl compound, vinyl acetate, vinylpyrrolidone, styrene, alphamethylstyrene, derivatives thereof and mixtures thereof.

6. The process of claim 1, wherein the copolymer comprises at least one monomer e) obtained from pentaerythritol, sorbitol, sucrose or mixtures thereof.

7. The process of claim 1, wherein the copolymer has a specific viscosity of no more than 5.

8. The process of claim 1, wherein the copolymer has a specific viscosity of no more than 2.

9. The process of claim 1, wherein the copolymer comprises monomer a) in an amount of from 2% to 85%, the monomer b) in an amount of from 0 to 80%, the monomer c) in an amount of from 20 to 95%, the monomer d) in an amount of from 0 to 50%, and the monomer e) in an amount of from 0 to 3%.

10. The process of claim 1, wherein the copolymer comprises monomer a) in an amount of from 2 to 80%.

11. The process of claim 1, wherein the copolymer comprises monomer b) in an amount of from 0 to 50%.

12. The process of claim 1, wherein the copolymer comprises monomer b) in an amount of from 0 to 20%.

13. The process of claim 1, wherein
monomer a) is selected from the group consisting of acrylic and methacrylic acid, and
monomer b) is selected from the group consisting of itaconic acid, maleic acid, acrylamido-methyl-propane sulphonic acid, sodium methallylsulphonate, vinyl sulphonic acid, styrene sulphonic acid, ethylene glycol methacrylate phosphate, propylene glycol methacrylate phosphate, ethylene glycol acrylate phosphate, propylene glycol acrylate phosphate, ethoxylates thereof and mixtures thereof.

14. The process as claimed in claim 1, comprising grinding.

15. The process as claimed in claim 1, comprising dispersing.

16. The process as claimed in claim 1, wherein the copolymer is in acid form, is optionally distilled, and is partially neutralized, completely neutralized or combination thereof, by one or more neutralization agents having a monovalent neutralizing function or a polyvalent neutralizing function.

17. The process of claim 16, wherein the copolymer is partially or completely neutralized by an alkali cation, an aliphatic amine, a cyclic amine, a primary amine, a secondary amine, a tertiary amine, an ethanolamine, an alkaline-earth divalent cation, a trivalent cation, a cation with higher valency or a mixture thereof.

18. The process of claim 16, wherein the neutralizing agent is selected from the group consisting of a sodium cation, a potassium cation, a lithium cation, an ammonium cation, stearylamine, monoethanolamine, diethanolamine, triethanolamine, monoethylamine, diethylamine, cyclohexylamine, methylcyclohexylamine, a magnesium cation, a calcium cation, a zinc cation, an aluminum cation and a mixture thereof.

19. The process of claim 16, wherein the copolymer is obtained from a copolymerization reaction, and is treated and separated into a plurality of phases, before or after complete or partial neutralization, by treating with one or more polar solvents selected from the group consisting of water, methanol, ethanol, propanol, isopropanol, butanol, acetone, tetrahydrofuran and mixtures thereof.

20. A dispersing and/or grinding agent comprising a copolymer comprising polymerized units of
a) at least one anionic monomer with an unsaturated ethylenic chain and a monocarboxylic function,
b) optionally, at least one anionic monomer with an unsaturated ethylenic chain and a dicarboxylic, sulphonic, phosphoric, phosphonic function or a combination thereof,
c) at least one non-ionic monomer with an unsaturated ethylenic chain of formula (I):

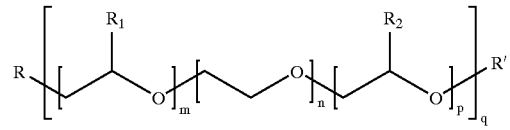

in which
m and p represent a number of alkylene oxide units and are less than or equal to 150,
n represents a number of ethylene oxide units and is less than or equal to 150,
q represents a number at least equal to 1 and $$5 \leq (m+n+p)q \leq 150$$

$R_1$ is hydrogen, methyl or ethyl radical,
$R_2$ is hydrogen, methyl or ethyl radical,
R is selected from the group consisting of acrylurethane, methacrylurethane, α-α'-dimethyl-isopropenylbenzyl urethane and allyl urethane,
R' represents a hydrocarbon radical having 1 to 5 carbon atoms,
d) optionally, an acrylamide monomer, methacrylamide monomer, a derivative thereof or a mixture thereof, or one or more non water-soluble monomers, and
e) optionally, at least one monomer having at least two unsaturated ethylenic chains selected from the group consisting of ethylene glycol dimethacrylate, trimethylolpropane-triacrylate, allyl acrylate, an allyl maleate, methylenebisacrylamide, methylenebismethacrylamide, tetrallyloxyethane, a triallylcyanurate, and an allyl ether obtained from a polyol,
wherein the total of a), b), c), d) and e) is 100%, and
wherein the copolymer has a specific viscosity of no more than 10.

21. The dispersing and/or grinding agent of claim 20, wherein the copolymer comprises at least one monomer a) selected from the group consisting of acrylic acid, methacrylic acid, a diacid hemiester and mixtures thereof.

22. The dispersing and/or grinding agent of claim 20, wherein the copolymer comprises at least one monomer a) selected from the group consisting of a $C_1$ to $C_4$ monoester of maleic acid, a $C_1$ to $C_4$ monoester of itaconic acid and mixtures thereof.

23. The dispersing and/or grinding agent of claim 20, wherein the copolymer comprises at least one anionic monomer b) selected from the group consisting of crotonic acid, isocrotonic acid, cinnamic acid, itaconic acid, maleic acid, citraconic acid, a carboxylic acid anhydride, maleic anhydride, acrylamido-methyl-propanesulphonic acid, sodium methallyl sulphonate, vinyl sulfonic acid, styrene sulphonic acid, vinyl phosphoric acid, ethylene glycol methacrylic phosphate, and phosphonic vinyl acid.

24. The dispersing and/or grinding agent of claim 20, wherein the copolymer comprises at least one monomer d) selected from the group consisting of an alkylacrylate, an alkyl methacrylate, a vinyl compound, vinyl acetate, vinylpyrrolidone, styrene, alphamethylstyrene, derivatives thereof and mixtures thereof.

25. The dispersing and/or grinding agent of claim 20, wherein the copolymer comprises at least one monomer e) obtained from pentaerythritol, sorbitol, sucrose or mixtures thereof.

26. The dispersing and/or grinding agent of claim 20, wherein the copolymer has a specific viscosity of no more than 5.

27. The dispersing and/or grinding agent of claim 20, wherein the copolymer has a specific viscosity of no more than 2.

28. The dispersing and/or grinding agent of claim 20, wherein the copolymer comprises monomer a) in an amount of from 2% to 85%, the monomer b) in an amount of from 0 to 80%, the monomer c) in an amount of from 20 to 95%, the monomer d) in an amount of from 0 to 50%, and the monomer e) in an amount of from 0 to 3%.

29. The dispersing and/or grinding agent of claim 20, wherein the copolymer comprises monomer a) in an amount of from 2 to 80%.

30. The dispersing and/or grinding agent of claim 20, wherein the copolymer comprises monomer b) in an amount of from 0 to 50%.

31. The dispersing and/or grinding agent of claim 20, wherein the copolymer comprises monomer b) in an amount of from 0 to 20%.

32. The dispersing and/or grinding agent of claim 20, wherein
monomer a) is selected from the group consisting of acrylic acid and methacrylic acid, and
monomer b) is selected from the group consisting of itaconic acid, maleic acid, acrylamido-methyl-propane sulphonic acid, sodium methallylsulphonate, vinyl sulphonic acid, styrene sulphonic acid, ethylene glycol methacrylate phosphate, propylene glycol methacrylate phosphate, ethylene glycol acrylate phosphate, propylene glycol acrylate phosphate, ethoxylates thereof and mixtures thereof.

33. The dispersing and/or grinding agent of claim 32, wherein the copolymer is obtained by neutralizing with a neutralizing agent having a monovalent or polyvalent neutralizing function, said neutralizing agent selected from the group consisting of an alkaline cation, an aliphatic amine, a cyclic amine, a primary amine, a secondary amine, a tertiary amine, an ethanolamine, an alkaline-earth divalent cation, a trivalent cation, a cation with higher valency or a mixture thereof.

34. The dispersing and/or grinding agent of claim 32, wherein the copolymer is obtained by neutralizing with a neutralizing agent having a monovalent or polyvalent neutralizing function, said neutralizing agent selected from the group consisting of a sodium cation, a potassium cation, a lithium cation, an ammonium cation, stearylamine, monoethanolamine, diethanolamine, triethanolamine, monoethylamine, diethylamine, cyclohexylamine, methylcyclohexylamine, a magnesium cation, a calcium cation, a zinc cation, an aluminum cation and a mixture thereof.

35. The dispersing and/or grinding agent of claim 20, wherein the copolymer is obtained from a copolymerization reaction, and is treated and separated into a plurality of phases, before or after complete or partial neutralization, by treating with one or more polar solvents selected from the group consisting of water, methanol, ethanol, propanol, isopropanol, butanol, acetone, tetrahydrofuran and mixtures thereof.

36. An aqueous suspension comprising at least one of a filler or pigment and the dispersing and/or grinding agent of claim 20,
wherein the dispersing and/or grinding agent is present in an amount of from 0.05 to 5% by dry weight based on the dry weight of the fillers and pigments.

37. The aqueous suspension of claim 36, wherein the dispersing agent is present in an amount of from 0.3 to 1.0% by dry weight.

38. The aqueous suspension as claimed in claim 36, wherein the fillers and pigments are selected from the group consisting of a natural calcium carbonate, a calcite, a chalk, a marble, a synthetic calcium carbonate, a precipitated calcium carbonate, a dolomite, a magnesium hydroxide, a kaolin, a talc, a gypsum, titanium dioxide, aluminum hydroxide and a filler or pigment used in the papermaking or petroleum field.

39. The aqueous suspension of claim 36 having a zeta potential of from 0 to −30 mV.

40. The aqueous suspension of claim 36, wherein the zeta potential is from 0 to −20 mV.

41. A process for manufacturing a sheet of paper with a composition comprising the aqueous suspension of claim 36.

42. A sheet of paper obtained by the process of claim 41.

43. A process comprising
coating a sheet of paper with a composition comprising the aqueous suspension of claim 36.

44. A sheet of paper obtained by the process of claim 43.

45. A process comprising
prospecting for or extracting petroleum, wherein the aqueous suspension of claim 36 is incorporated into a saturated salt mud or seawater mud.

46. A drilling mud comprising the aqueous suspension of claim 36.

47. A paint comprising the dispersing and/or grinding agent of claim 20.

48. A thermoplastic or thermosetting resin comprising the dispersing and/or grinding agent of claim 20.

49. A process comprising:
at least one of dispersing or grinding a mineral pigment, filler or combination thereof, in aqueous suspension in the presence of a water-soluble copolymer,
wherein said water-soluble copolymer comprises polymerized units of
a) at least one anionic monomer with an unsaturated ethylenic chain and a monocarboxylic function,
b) optionally, at least one anionic monomer with an unsaturated ethylenic chain and a dicarboxylic, sulphonic, phosphoric, phosphonic function or a combination thereof,
c) at least one non-ionic monomer having an unsaturated ethylenic chain of formula (I):

$$R\left[\begin{array}{c}R_1\\|\\CH_2-CH\\|\\O\end{array}\right]_m O\left[\begin{array}{c}\\CH_2CH_2\\|\\O\end{array}\right]_n\left[\begin{array}{c}R_2\\|\\CH_2-CH\\|\\O\end{array}\right]_p\Bigg]_q R'$$

in which
m and p represent a number of alkylene oxide units and are less than or equal to 150,
n represents a number of ethylene oxide units and is less than or equal to 150,
q represents a number at least equal to 1 and $$5 \leq (m+n+p)q \leq 150$$

$R_1$ is hydrogen, methyl or ethyl radical,
$R_2$ is hydrogen, methyl or ethyl radical, R is an acrylic ester, a methacrylic ester, a maleic ester, an itaconic ester, a crotonic ester, a vinyl phthalic ester, an unsaturated urethane, an allyl ether, a vinyl ether or an ethylenically unsaturated amide, R' represents a hydrocarbon radical having 1 to 5 carbon atoms, d) optionally, an acrylamide monomer, methacrylamide monomer, a derivative thereof or a mixture thereof, or one or more non water-soluble monomers, and e) at least one monomer having at least two unsaturated ethylenic chains selected from the group consisting of ethylene glycol dimethacrylate, trimethylolpropane-triacrylate, allyl acrylate, an allyl maleate, methylenebisacrylamide, methylenebismethacrylamide, tetrallyloxyethane, a triallylcyanurate, and an allyl ether obtained from a pentaerythritol, sorbitol, sucrose or mixtures thereof, wherein the total of a), b), c), d) and e) is 100%, and wherein the copolymer has a specific viscosity of no more than 10.

50. The process of claim 49, wherein the copolymer comprises at least one monomer a) selected from the group consisting of acrylic acid, methacrylic acid, a diacid hemiester and mixtures thereof.

51. The process of claim 49, wherein the copolymer comprises at least one monomer a) selected from the group consisting of a $C_1$ to $C_4$ monoester of maleic acid, a $C_1$ to $C_4$ monoester of itaconic acid and mixtures thereof.

52. The process of claim 49, wherein the copolymer comprises at least one anionic monomer b) selected from the group consisting of crotonic acid, isocrotonic acid, cinnamic acid, itaconic acid, maleic acid, citraconic acid, a carboxylic acid anhydride, maleic anhydride, acrylamido-methyl-propanesulphonic acid, sodium methallyl sulphonate, vinyl sulfonic acid, styrene sulphonic acid, vinyl phosphoric acid, ethylene glycol methacrylic phosphate, propylene glycol methacrylic phosphate, ethylene glycol acrylate phosphate, propylene glycol acrylate phosphate, ethoxylates thereof, phosphonic vinyl acid and mixtures thereof.

53. The process of claim 49, wherein the copolymer comprises at least one non-ionic monomer c) wherein R is selected from the group consisting of acrylurethane, methacrylurethane, α-α'-dimethylisopropenylbenzyl urethane and allyl urethane.

54. The process of claim 49, wherein the copolymer comprises at least one monomer d) selected from the group consisting of an alkylacrylate, an alkyl methacrylate, a vinyl compound, vinyl acetate, vinylpyrrolidone, styrene, alphamethylstyrene, derivatives thereof and mixtures thereof.

55. The process of claim 49, wherein the copolymer has a specific viscosity of no more than 5.

56. The process of claim 49, wherein the copolymer has a specific viscosity of no more than 2.

57. The process of claim 49, wherein the copolymer comprises monomer a) in an amount of from 2% to 85%, the monomer b) in an amount of from 0 to 80%, the monomer c) in an amount of from 20 to 95%, the monomer d) in an amount of from 0 to 50%, and the monomer e) in an amount of from 0 to 3%.

58. The process of claim 49, wherein the copolymer comprises monomer a) in an amount of from 2 to 80%.

59. The process of claim 49, wherein the copolymer comprises monomer b) in an amount of from 0 to 50%.

60. The process of claim 49, wherein the copolymer comprises monomer b) in an amount of from 0 to 20%.

61. The process of claim 49, wherein monomer a) is selected from the group consisting of acrylic and methacrylic acid, and monomer b) is selected from the group consisting of itaconic acid, maleic acid, acrylamido-methyl-propane sulphonic acid, sodium methallylsulphonate, vinyl sulphonic acid, styrene sulphonic acid, ethylene glycol methacrylate phosphate, propylene glycol methacrylate phosphate, ethylene glycol acrylate phosphate, propylene glycol acrylate phosphate, ethoxylates thereof and mixtures thereof.

62. The process as claimed in claim 49, comprising grinding.

63. The process as claimed in claim 49, comprising dispersing.

64. The process as claimed in claim 49, wherein the copolymer is in acid form, is optionally distilled, and is partially neutralized, completely neutralized or combination thereof, by one or more neutralization agents having a monovalent neutralizing function or a polyvalent neutralizing function.

65. The process of claim 64, wherein the copolymer is partially or completely neutralized by an alkali cation, an aliphatic amine, a cyclic amine, a primary amine, a secondary amine, a tertiary amine, an ethanolanine, an alkaline-earth divalent cation, a trivalent cation, a cation with higher valency or a mixture thereof.

66. The process of claim 64, wherein the neutralizing agent is selected from the group consisting of a sodium cation, a potassium cation, a lithium cation, an ammonium cation, stearylamine, monoethanolamine, diethanolamine, triethanolamine, monoethylamine, diethylamine, cyclohexylamine, methylcyclohexylamine, a magnesium cation, a calcium cation, a zinc cation, an aluminum cation and a mixture thereof.

67. The process of claim 64, wherein the copolymer is obtained from a copolymerization reaction, and is treated and separated into a plurality of phases, before or after complete or partial neutralization, by treating with one or more polar solvents selected from the group consisting of water, methanol, ethanol, propanol, isopropanol, butanol, acetone, tetrahydrofuran and mixtures thereof.

68. A dispersing and/or grinding agent comprising a copolymer comprising polymerized units of a) at least one anionic monomer with an unsaturated ethylenic chain and a monocarboxylic function, b) optionally, at least one anionic monomer with an unsaturated ethylenic chain and a dicarboxylic, sulphonic, phosphoric, phosphonic function or a combination thereof, c) at least one non-ionic monomer with an unsaturated ethylenic chain of formula (I):

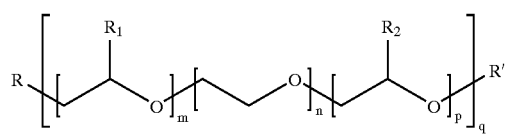

in which
- m and p represent a number of alkylene oxide units and are less than or equal to 150,
- n represents a number of ethylene oxide units and is less than or equal to 150,
- q represents a number at least equal to 1 and $$5 \leq (m+n+p)q \leq 150$$

$R_1$ is hydrogen, methyl or ethyl radical, $R_2$ is hydrogen, methyl or ethyl radical, R is an acrylic ester, a methacrylic ester, a maleic ester, a itaconic ester, a crotonic ester, a vinyl phthalic ester, an unsaturated urethane, an allyl ether, a vinyl ether or an ethylenically unsaturated amide, R' represents a hydrocarbon radical having 1 to 5 carbon atoms, d) optionally, an acrylamide monomer, methacrylamide monomer, a derivative thereof or a mixture thereof, or one or more non water-soluble monomers, and e) at least one monomer having at least two unsaturated ethylenic chains selected from the group consisting of ethylene glycol dimethacrylate, trimethylolpropane-triacrylate, allyl acrylate, an allyl maleate, methylenebisacrylamide, methylenebismethacrylamide, tetrallyloxyethane, a triallylcyanurate, and an allyl ether obtained from a pentaerythritol, sorbitol, sucrose or mixtures thereof, wherein the total of a), b), c), d) and e) is 100%, and wherein the copolymer has a specific viscosity of no more than 10.

69. The dispersing and/or grinding agent of claim 68, wherein the copolymer comprises at least one monomer a) selected from the group consisting of acrylic acid, methacrylic acid, a diacid hemiester and mixtures thereof.

70. The dispersing and/or grinding agent of claim 68, wherein the copolymer comprises at least one monomer a) selected from the group consisting of a $C_1$ to $C_4$ monoester of maleic acid, a $C_1$ to $C_4$ monoester of itaconic acid and mixtures thereof.

71. The dispersing and/or grinding agent of claim 68, wherein the copolymer comprises at least one anionic monomer b) selected from the group consisting of crotonic acid, isocrotonic acid, cinnamic acid, itaconic acid, maleic acid, citraconic acid, a carboxylic acid anhydride, maleic anhydride, acrylamido-methyl-propanesulphonic acid, sodium methallyl sulphonate, vinyl sulfonic acid, styrene sulphonic acid, vinyl phosphoric acid, ethylene glycol methacrylic phosphate, and phosphonic vinyl acid.

72. The dispersing and/or grinding agent of claim 68, wherein the copolymer comprises at least one non-ionic monomer c) wherein R is selected from the group consisting of acrylurethane, methacrylurethane, α-α'-dimethyl-isopropenylbenzyl urethane and allyl urethane.

73. The dispersing and/or grinding agent of claim 68, wherein the copolymer comprises at least one monomer d) selected from the group consisting of an alkylacrylate, an alkyl methacrylate, a vinyl compound, vinyl acetate, vinylpyrrolidone, styrene, alphamethylstyrene, derivatives thereof and mixtures thereof.

74. The dispersing and/or grinding agent of claim 68, wherein the copolymer has a specific viscosity of no more than 5.

75. The dispersing and/or grinding agent of claim 68, wherein the copolymer has a specific viscosity of no more than 2.

76. The dispersing and/or grinding agent of claim 68, wherein the copolymer comprises monomer a) in an amount of from 2% to 85%, the monomer b) in an amount of from 0 to 80%, the monomer c) in an amount of from 20 to 95%, the monomer d) in an amount of from 0 to 50%, and the monomer e) in an amount of from 0 to 3%.

77. The dispersing and/or grinding agent of claim 68, wherein the copolymer comprises monomer a) in an amount of from 2 to 80%.

78. The dispersing and/or grinding agent of claim 68, wherein the copolymer comprises monomer b) in an amount of from 0 to 50%.

79. The dispersing and/or grinding agent of claim 68, wherein the copolymer comprises monomer b) in an amount of from 0 to 20%.

80. The dispersing and/or grinding agent of claim 68, wherein monomer a) is selected from the group consisting of acrylic acid and methacrylic acid, and monomer b) is selected from the group consisting of itaconic acid, maleic acid, acrylamido-methyl-propane sulphonic acid, sodium methallylsulphonate, vinyl sulphonic acid, styrene sulphonic acid, ethylene glycol methacrylate phosphate, propylene glycol methacrylate phosphate, ethylene glycol acrylate phosphate, propylene glycol acrylate phosphate, ethoxylates thereof and mixtures thereof.

81. The dispersing and/or grinding agent of claim 80, wherein the copolymer is obtained by neutralizing with a neutralizing agent having a monovalent or polyvalent neutralizing function, said neutralizing agent selected from the group consisting of an alkaline cation, an aliphatic amine, a cyclic amine, a primary amine, a secondary amine, a tertiary amine, an ethanolamine, an alkaline-earth divalent cation, a trivalent cation, a cation with higher valency or a mixture thereof.

82. The dispersing and/or grinding agent of claim 80, wherein the copolymer is obtained by neutralizing with a neutralizing agent having a monovalent or polyvalent neutralizing function, said neutralizing agent selected from the group consisting of a sodium cation, a potassium cation, a lithium cation, an ammonium cation, stearylamine, monoethanolamine, diethanolamine, triethanolamine, monoethylamine, diethylamine, cyclohexylamine, methylcyclohexylamine, a magnesium cation, a calcium cation, a zinc cation, an aluminum cation and a mixture thereof.

83. The dispersing and/or grinding agent of claim 68, wherein the copolymer is obtained from a copolymerization reaction, and is treated and separated into a plurality of phases, before or after complete or partial neutralization, by treating with one or more polar solvents selected from the group consisting of water, methanol, ethanol, propanol, isopropanol, butanol, acetone, tetrahydrofuran and mixtures thereof.

84. An aqueous suspension comprising at least one of a filler or pigment and the dispersing and/or grinding agent of claim 68, wherein the dispersing and/or grinding agent is present in an amount of from 0.05 to 5% by dry weight based on the dry weight of the fillers and pigments.

85. The aqueous suspension of claim 84, wherein the dispersing agent is present in an amount of from 0.3 to 1.0% by dry weight.

86. The aqueous suspension as claimed in claim 84, wherein the fillers and pigments are selected from the group consisting of a natural calcium carbonate, a calcite, a chalk, a marble, a synthetic calcium carbonate, a precipitated calcium carbonate, a dolomite, a magnesium hydroxide, a kaolin, a talc, a gypsum, titanium dioxide, aluminum hydroxide and a filler or pigment used in the papermaking or petroleum field.

87. The aqueous suspension of claim 84, having a zeta potential of from 0 to −30 mV.

88. The aqueous suspension of claim 84, wherein the zeta potential is from 0 to −20 mV.

89. A process for manufacturing a sheet of paper with a composition comprising the aqueous suspension of claim 84.

90. A sheet of paper obtained by the process of claim 89.

91. A process comprising
coating a sheet of paper with a composition comprising the aqueous suspension of claim 84.

92. A sheet of paper obtained by the process of claim 91.

93. A process comprising
prospecting for or extracting petroleum, wherein the aqueous suspension of claim 84 is incorporated into a saturated salt mud or seawater mud.

94. A drilling mud comprising the aqueous suspension of claim 84.

95. A paint comprising the dispersing and/or grinding agent of claim 68.

96. A thermoplastic or thermosetting resin comprising the dispersing and/or grinding agent of claim 68.

* * * * *